United States Patent
Wakabayashi et al.

(10) Patent No.: US 11,954,804 B2
(45) Date of Patent: Apr. 9, 2024

(54) INFORMATION PROCESSING DEVICE AND INFORMATION PROCESSING METHOD TO DISPLAY A VIRTUAL OBJECT

(71) Applicant: SONY CORPORATION, Tokyo (JP)

(72) Inventors: Hajime Wakabayashi, Tokyo (JP); Kuniaki Torii, Tokyo (JP); Ryo Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 527 days.

(21) Appl. No.: 17/250,690

(22) PCT Filed: Aug. 14, 2019

(86) PCT No.: PCT/JP2019/031905
§ 371 (c)(1),
(2) Date: Feb. 19, 2021

(87) PCT Pub. No.: WO2020/045092
PCT Pub. Date: Mar. 5, 2020

(65) Prior Publication Data
US 2022/0122345 A1 Apr. 21, 2022

(30) Foreign Application Priority Data

Aug. 28, 2018 (JP) ................................. 2018-159232

(51) Int. Cl.
*G06T 19/00* (2011.01)
*G06F 18/22* (2023.01)
(Continued)

(52) U.S. Cl.
CPC .............. *G06T 19/00* (2013.01); *G06F 18/22* (2023.01); *G06T 19/006* (2013.01);
(Continued)

(58) Field of Classification Search
CPC ...... G06T 19/00; G06T 19/006; G06V 10/761; G06V 20/56; G06V 20/58; G06V 20/588; G06F 18/22
See application file for complete search history.

(56) References Cited

U.S. PATENT DOCUMENTS 9,280,849 B2 * 3/2016 Adhikari ............... G06T 19/006
2013/0148851 A1 * 6/2013 Leung ..................... G06T 7/74
382/103

(Continued)

FOREIGN PATENT DOCUMENTS

AU 2011253973 A1 6/2013
JP 2004-46326 A 2/2004

(Continued)

OTHER PUBLICATIONS

International Search Report and Written Opinion of PCT Application No. PCT/JP2019/031905, dated Nov. 19, 2019, 08 pages of ISRWO.

*Primary Examiner* — Siamak Harandi
*Assistant Examiner* — Daniella M. DiGuglielmo
(74) *Attorney, Agent, or Firm* — CHIP LAW GROUP

(57) ABSTRACT

Provided is an information processing device that enables a virtual object to be displayed at an appropriate position in the real world. The information processing device includes a position estimation unit that estimates a current position in a first coordinate system, a display position setting unit that sets a display position of a virtual object in a third coordinate system on the basis of an environment database, virtual object information including the display position of the virtual object in a second coordinate system, and an observed image captured near the current position, a meta information generation unit that generates observation meta information, and an environment database management unit that compares observation data with environment data of the (Continued)

environment database to determine whether to add the observation data to the environment database.

19 Claims, 16 Drawing Sheets

(51) Int. Cl.
    *G06V 10/74*     (2022.01)
    *G06V 20/56*     (2022.01)
    *G06V 20/58*     (2022.01)

(52) U.S. Cl.
    CPC ............ *G06V 10/761* (2022.01); *G06V 20/56* (2022.01); *G06V 20/58* (2022.01); *G06V 20/588* (2022.01)

(56) References Cited

U.S. PATENT DOCUMENTS

| | | | | |
|---|---|---|---|---|
| 2014/0253591 | A1* | 9/2014 | Hayakawa | ............ G06T 19/006 345/633 |
| 2014/0313228 | A1* | 10/2014 | Kasahara | .............. G06T 19/006 345/633 |

FOREIGN PATENT DOCUMENTS

| | | | | |
|---|---|---|---|---|
| JP | 2013-114491 | A | | 6/2013 |
| JP | 2013-127783 | A | | 6/2013 |
| JP | 2014-170483 | A | | 9/2014 |
| JP | 2017-16166 | A | | 1/2017 |
| JP | 2017016166 | A | * | 1/2017 ........... G06T 19/006 |
| JP | 2017-508200 | A | | 3/2017 |
| WO | 2015/072091 | A1 | | 5/2015 |

\* cited by examiner

INFORMATION PROCESSING DEVICE AND INFORMATION PROCESSING METHOD TO DISPLAY A VIRTUAL OBJECT

CROSS REFERENCE TO RELATED APPLICATIONS

This application is a U.S. National Phase of International Patent Application No. PCT/JP2019/031905 filed on Aug. 14, 2019, which claims priority benefit of Japanese Patent Application No. JP 2018-159232 filed in the Japan Patent Office on Aug. 28, 2018. Each of the above-referenced applications is hereby incorporated herein by reference in its entirety.

TECHNICAL FIELD

The present technology relates to an information processing device, an information processing method, and a program, and more particularly to an information processing device, an information processing method, and a program that achieves augmented reality (AR).

BACKGROUND ART

In recent years, the development of technology using AR has been active (see Patent Document 1, for example).

CITATION LIST

Patent Document

Patent Document 1: Japanese Patent Application Laid-Open No. 2017-508200

SUMMARY OF THE INVENTION

Problems to be Solved by the Invention

In AR, a virtual object, which is virtual visual information, is displayed so as to be superimposed on the real world. Accordingly, it is important to display the virtual object at an appropriate position in the real world.

The present technology has been made in view of such a situation, and makes it possible to display a virtual object at an appropriate position in the real world.

Solutions to Problems

An information processing device of one aspect of the present technology includes: a position estimation unit that estimates a current position in a first coordinate system; a display position setting unit that sets a display position of a virtual object in a third coordinate system on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position; a meta information generation unit that generates observation meta information that is meta information corresponding to the observed image; and an environment database management unit that compares observation data including the observed image or observation feature point data containing data related to a feature point of the observed image and the observation meta information with the environment data of the environment database to determine whether to add the observation data to the environment database.

An information processing method of one aspect of the present technology includes: by an information processing device, estimating a current position in a first coordinate system; setting a display position of a virtual object in a third coordinate system on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position; generating observation meta information that is meta information corresponding to the observed image; and comparing observation data including the observed image or observation feature point data containing data related to a feature point of the observed image and the observation meta information with the environment data of the environment database to determine whether to add the observation data to the environment database.

A program of one aspect of the present technology causes a computer to perform processing of: estimating a current position in a first coordinate system; setting a display position of a virtual object in a third coordinate system on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position; generating observation meta information that is meta information corresponding to the observed image; and comparing observation data including the observed image or observation feature point data containing data related to a feature point of the observed image and the observation meta information with the environment data of the environment database to determine whether to add the observation data to the environment database.

In one aspect of the present technology, a current position in a first coordinate system is estimated, a display position of a virtual object in a third coordinate system is set on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position, observation meta information that is meta information corresponding to the observed image is generated, and observation data including the observed image or observation feature point data containing data related to a feature point of the observed image and the observation meta information is compared with the environment data of the environment database to determine whether to add the observation data to the environment database.

Effects of the Invention

According to one aspect of the present technology, a virtual object can be displayed at an appropriate position in the real world.

Note that the effect described herein is not necessarily limited, and the effect may be any of those described in the present disclosure.

MODE FOR CARRYING OUT THE INVENTION

Hereinafter, modes for carrying out the present technology will be described. The description will be given in the following order.
1. First Embodiment
2. Second Embodiment
3. Third Embodiment
4. Fourth Embodiment
5. Fifth Embodiment
6. Modification
7. Other 1. First Embodiment First, a first embodiment of the present technology will be described with reference to FIGS. 1 to 6.

<Configuration Example of Information Processing System 1>

Figure 1:
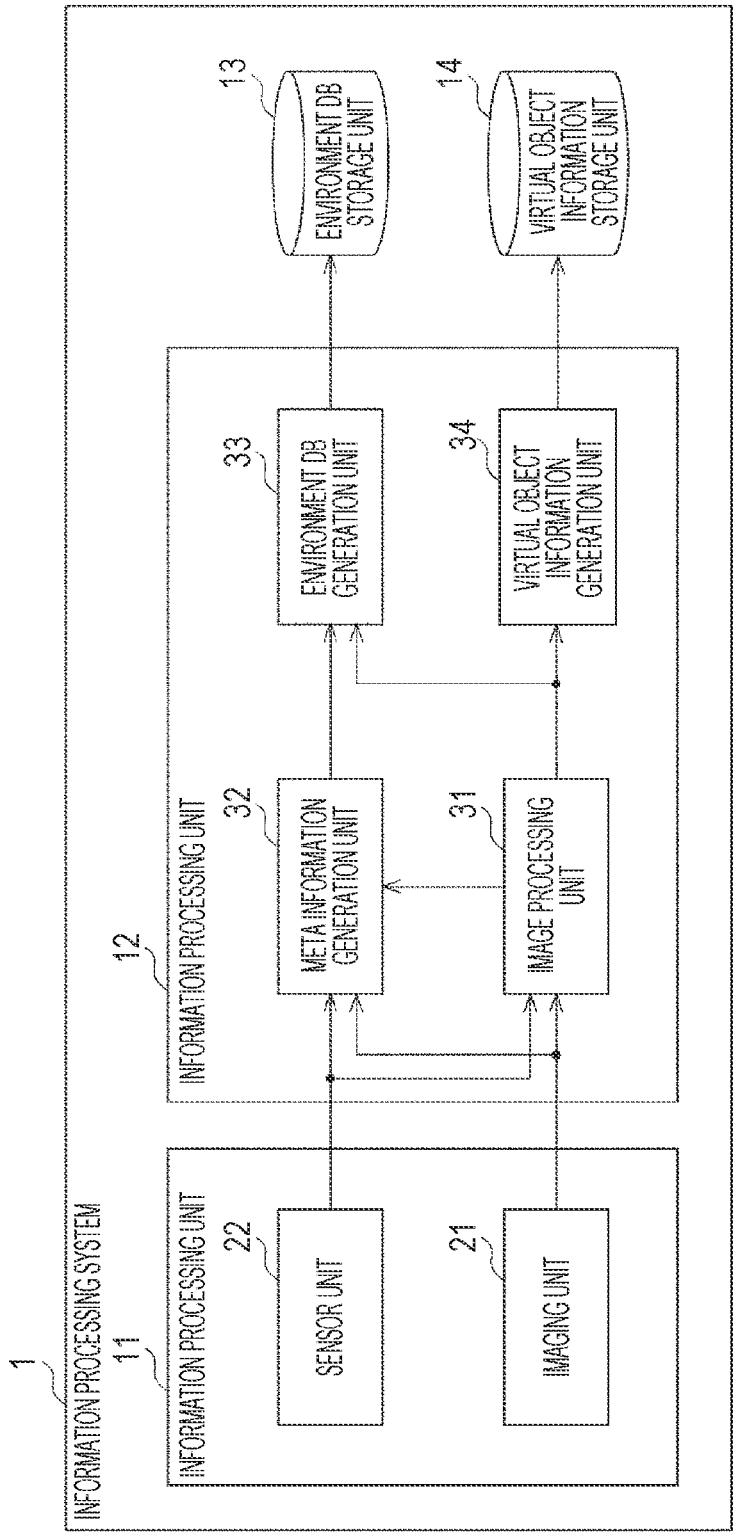
FIG. 1 is a block diagram showing a configuration example of an information processing system of a first embodiment of the present technology.

FIG. 1 is a block diagram showing a configuration example of an information processing system 1 to which the present technology is applied.

The information processing system 1 is a system that generates an environment database (DB) and virtual object information used by an information processing system 101 described later.

Here, the environment DB is a database used by the information processing system 101 to estimate its current position (self-position). Virtual object information is information used by the information processing system 101 to display a virtual object.

The information processing system 1 includes a data acquisition unit 11, an information processing unit 12, an environment DB storage unit 13, and a virtual object information storage unit 14.

The data acquisition unit 11 acquires data used for generating the environment DB and virtual object information. The data acquisition unit 11 includes an imaging unit 21 and a sensor unit 22.

The imaging unit 21 includes a camera, and supplies an image (hereinafter referred to as reference image) obtained by imaging the surroundings to an image processing unit 31 of the information processing unit 12. A reference image is an image that is referred to in current position estimation processing of the information processing system 101 described later. Additionally, the imaging unit 21 supplies parameters related to capturing of the reference image (hereinafter referred to as imaging parameters) to a meta information generation unit 32 of the information processing unit 12.

Note that the imaging unit 21 may include multiple cameras.

The sensor unit 22 includes various sensors used for generating an environment DB such as an inertial measurement unit (IMU), a global navigation satellite system (GNSS) receiver, and a geomagnetic sensor. The sensor unit 22 supplies data indicating the detection result of each sensor (hereinafter referred to as sensor data) to the image processing unit 31 and the meta information generation unit 32 of the information processing unit 12.

The information processing unit 12 generates the environment DB and virtual object information on the basis of the reference image and sensor data. The information processing unit 12 includes the image processing unit 31, the meta information generation unit 32, an environment DB generation unit 33, and a virtual object information generation unit 34.

The image processing unit 31 estimates the imaging position of each reference image and generates point cloud data based on each reference image. The image processing unit 31 supplies data indicating the imaging position of each reference image to the meta information generation unit 32, supplies each reference image to the environment DB generation unit 33, and supplies point cloud data to the virtual object information generation unit 34.

Additionally, the image processing unit 31 performs object recognition processing on each reference image, and supplies data indicating the recognition result (hereinafter referred to as object recognition data) to the meta information generation unit 32.

The meta information generation unit 32 generates, for each reference image, meta information (hereinafter referred to as reference meta information) including imaging parameters, sensor data, object recognition data, imaging position, and imaging date and time corresponding to each reference image. The meta information generation unit 32 supplies the reference meta information corresponding to each reference image to the environment DB generation unit 33.

The environment DB generation unit 33 generates an environment DB on the basis of the reference image and the reference meta information, and stores the environment DB in the environment DB storage unit 13.

The virtual object information generation unit 34 generates virtual object information on the basis of point cloud data and the like, and stores the virtual object information in the virtual object information storage unit 14.

<Configuration Example of Information Processing System 101>

Figure 2:
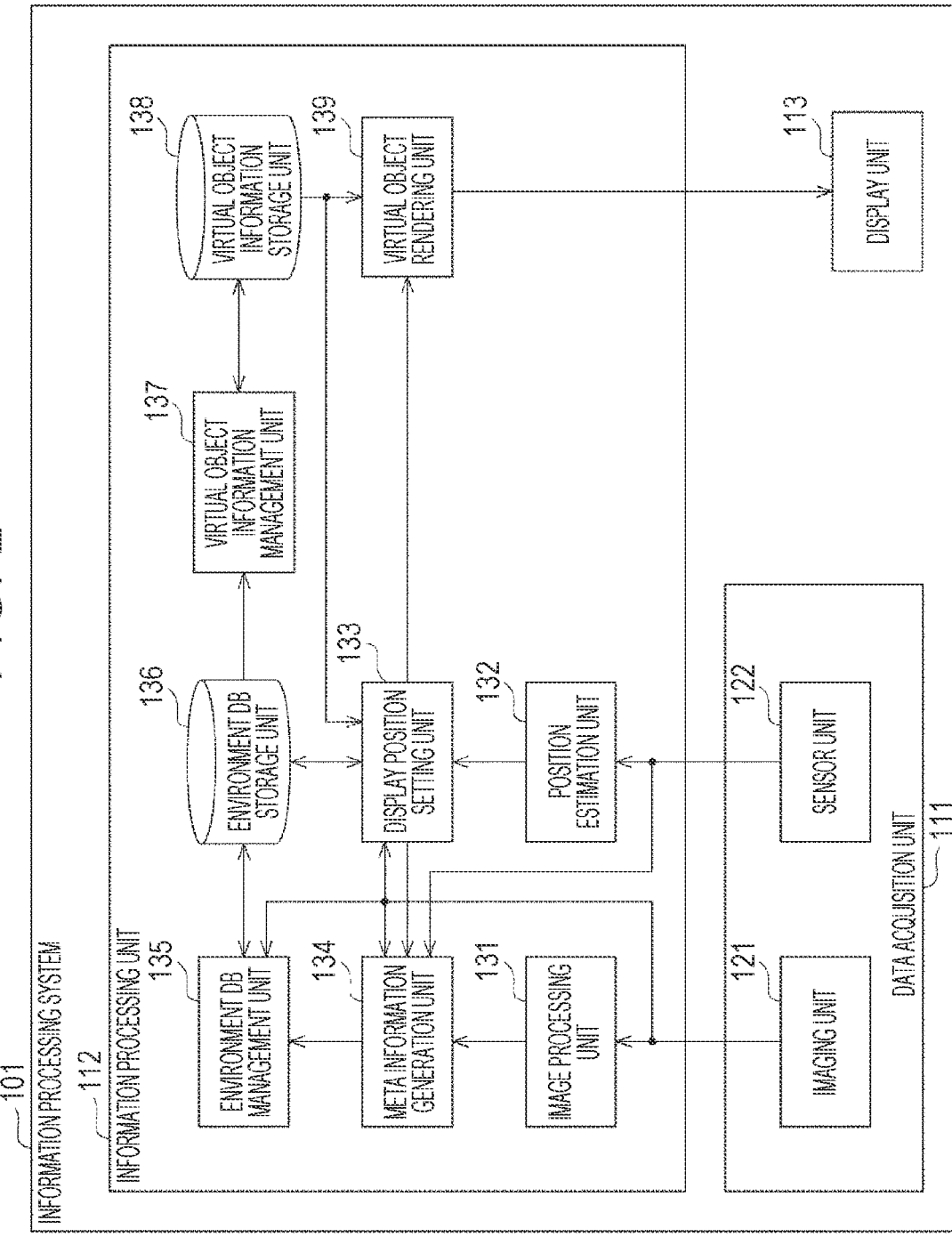
FIG. 2 is a block diagram showing a configuration example of the information processing system of the first embodiment of the present technology.

FIG. 2 is a block diagram showing a configuration example of the information processing system 101 to which the present technology is applied.

The information processing system 101 is a system that implements AR. For example, the information processing system 101 is provided on a moving body, or while the information processing system 101 itself moves, the information processing system 101 displays a virtual object so as to superimpose the virtual object on the real world or on an image of the real world in the field of view of the user of the information processing system 101. The information processing system 101 includes a data acquisition unit 111, an information processing unit 112, and a display unit 113.

Note that the mobile body provided with the information processing system 101 may be a mobile body ridden by the user, such as a vehicle, or may be the user himself/herself. For example, when the information processing system 101 forms a wearable device, the user who wears the information processing system 101 is the mobile body.

Additionally, the virtual object is virtual visual information for expanding the real world, and the content is not particularly limited.

The data acquisition unit 111 acquires data used for estimating the current position of the information processing system 101 and updating the environment DB and virtual object information. The data acquisition unit 111 includes an imaging unit 121 and a sensor unit 122.

The imaging unit 121 includes a camera, images the surroundings, and supplies an image (hereinafter referred to as observed image) obtained by the imaging to an image processing unit 131, a display position setting unit 133, and an environment DB management unit 135 of the information processing unit 112. The imaging unit 121 supplies parameters (imaging parameters) related to capturing of the observed image to a meta information generation unit 134.

Note that the imaging unit 121 may include multiple cameras.

The sensor unit 122 includes various sensors used for estimating the current position of the information processing system 101 and updating the environment DB, such as an IMU, a GNSS receiver, and a geomagnetic sensor. The sensor unit 122 supplies sensor data indicating the detection result of each sensor to a position estimation unit 132 and the meta information generation unit 134 of the information processing unit 112.

The image processing unit 131 performs object recognition processing on the observed image, and supplies data indicating the recognition result (hereinafter referred to as object recognition data) to the meta information generation unit 134.

The position estimation unit 132 estimates the current position of the information processing system 101 on the basis of the sensor data, and supplies data indicating the estimation result to the display position setting unit 133.

The display position setting unit 133 sets the display position of the virtual object on the basis of the estimation result of the current position of the information processing system 101, the observed image, the environment DB, and the virtual object information. The display position setting unit 133 supplies data indicating the display position of the virtual object to a virtual object rendering unit 139. Additionally, the display position setting unit 133 supplies, to the meta information generation unit 134, data indicating the imaging position of the observed image obtained in the process of setting the display position of the virtual object. Moreover, the display position setting unit 133 adds a reference date and time indicating the referenced date and time to the environment data of the environment DB referenced for setting the display position of the virtual object.

The meta information generation unit 134 generates meta information (hereinafter referred to as observation meta information) corresponding to the observed image on the basis of imaging parameters, sensor data, object recognition data, the imaging position of the observed image, and the like, and supplies the meta information to the environment DB management unit 135.

The environment DB management unit 135 updates the environment DB stored in an environment DB storage unit 136 on the basis of the observed image and the observation meta information.

The environment DB storage unit 136 stores the environment DB generated by the information processing system 1. The environment DB stored in the environment DB storage unit 136 is appropriately updated by the display position setting unit 133 and the environment DB management unit 135.

A virtual object information management unit 137 updates virtual object information stored in a virtual object information storage unit 138 on the basis of an environment DB or the like stored in the environment DB storage unit 136.

The virtual object information storage unit 138 stores virtual object information generated by the information processing system 1. The virtual object information stored in the virtual object information storage unit 138 is appropriately updated by the virtual object information management unit 137.

The virtual object rendering unit 139 generates image data for displaying the virtual object at the display position set by the display position setting unit 133 on the basis of the virtual object information stored in the virtual object information storage unit 138, and supplies the image data to the display unit 113.

The display unit 113 displays the virtual object based on the image data at the display position set by the display position setting unit 133.

<Data Generation Processing>

Figure 3:
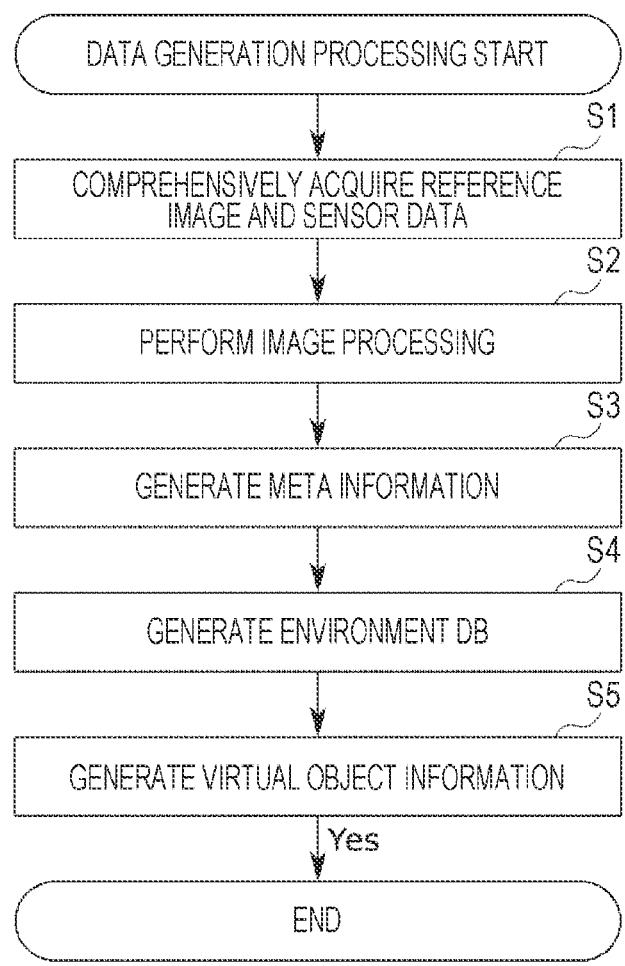
FIG. 3 is a flowchart for describing data generation processing.

Next, data generation processing performed by the information processing system 1 will be described with reference to the flowchart of FIG. 3.

This processing is started when the information processing system 1 is given a command to generate the environment DB and virtual object information, for example.

In step S1, the data acquisition unit 11 comprehensively acquires reference images and sensor data.

For example, the imaging unit 21 comprehensively images the inside of a space as a target for displaying the virtual object (hereinafter referred to as display target space), and supplies the obtained multiple reference images to the image processing unit 31. Additionally, the imaging unit 21 supplies imaging parameters indicating the imaging conditions and the like of each reference image to the meta information generation unit 32.

The imaging parameters include, for example, shutter speed, white balance value, F value, ISO value, and the like.

Additionally, each sensor of the sensor unit 22 acquires sensor data together with each reference image by performing detection processing at the time of and before and after capturing each reference image, and supplies the acquired sensor data to the image processing unit 31 and the meta information generation unit 32.

Sensor data includes, for example, acceleration, angular velocity, geomagnetism, GNSS signals, radio field intensity of various signals (e.g., Wi-Fi signals, Bluetooth (registered trademark) signals, and beacon signals), and the like.

In step S2, the image processing unit 31 performs image processing.

For example, the image processing unit 31 estimates the imaging position of each reference image by performing structure from motion/multi-view stereo (SfM/MVS) processing on a reference image group, and also generates point cloud data that is a 3D model of the display target area.

The imaging position of a reference image is represented by the position and orientation of a device (e.g., camera) that captures the reference image in the 3D coordinate system (world coordinate system) of the real world at the time of imaging, for example. Additionally, the position of each point in point cloud data is represented by the coordinates of the 3D coordinate system, for example.

Additionally, the image processing unit 31 acquires data related to objects in each reference image by performing object recognition processing on each reference image. For example, the image processing unit 31 performs semantic segmentation on each reference image to determine the types of objects (e.g., person, building, car, plant, and the like) in each reference image and the percentage of the area occupied by each type of object.

The image processing unit 31 supplies, to the meta information generation unit 32, data indicating the imaging position of each reference image and data (object recognition data) including the types of objects in each reference image and the percentage of the area occupied by each type of object. Additionally, the image processing unit 31 supplies point cloud data to the virtual object information generation unit 34. Moreover, the image processing unit 31 supplies each reference image to the environment DB generation unit 33.

In step S3, the meta information generation unit 32 generates meta information. Specifically, the meta information generation unit 32 generates, for each reference image, reference meta information including imaging parameters, object recognition data, imaging position, and imaging date and time corresponding to each reference image, as well as sensor data acquired together with each reference image. The meta information generation unit 32 supplies the reference meta information corresponding to each reference image to the environment DB generation unit 33.

In step S4, the environment DB generation unit 33 generates an environment DB. Specifically, the environment DB generation unit 33 generates, for each reference image, environment data including the reference image and reference meta information corresponding to the reference image. Then, the environment DB generation unit 33 generates an environment DB including the environment data corresponding to each reference image, and stores the environment DB in the environment DB storage unit 13.

In step S5, the virtual object information generation unit 34 generates virtual object information. Specifically, the virtual object information generation unit 34 sets the contents and position of displaying the virtual object in the point cloud data.

Note that the display position and display contents of the virtual object may be set by the user, or may be automatically set by the virtual object information generation unit 34, for example. Additionally, the display position of each virtual object is represented by the position and orientation (direction) thereof in the point cloud data, that is, the position and orientation thereof in the 3D coordinate system.

Then, the virtual object information generation unit 34 generates virtual object information including the point cloud data and the display position and display contents of each virtual object, and stores the virtual object information in the virtual object information storage unit 14.

Thereafter, the data generation processing ends.

<Virtual Object Display Processing>

Figure 4:
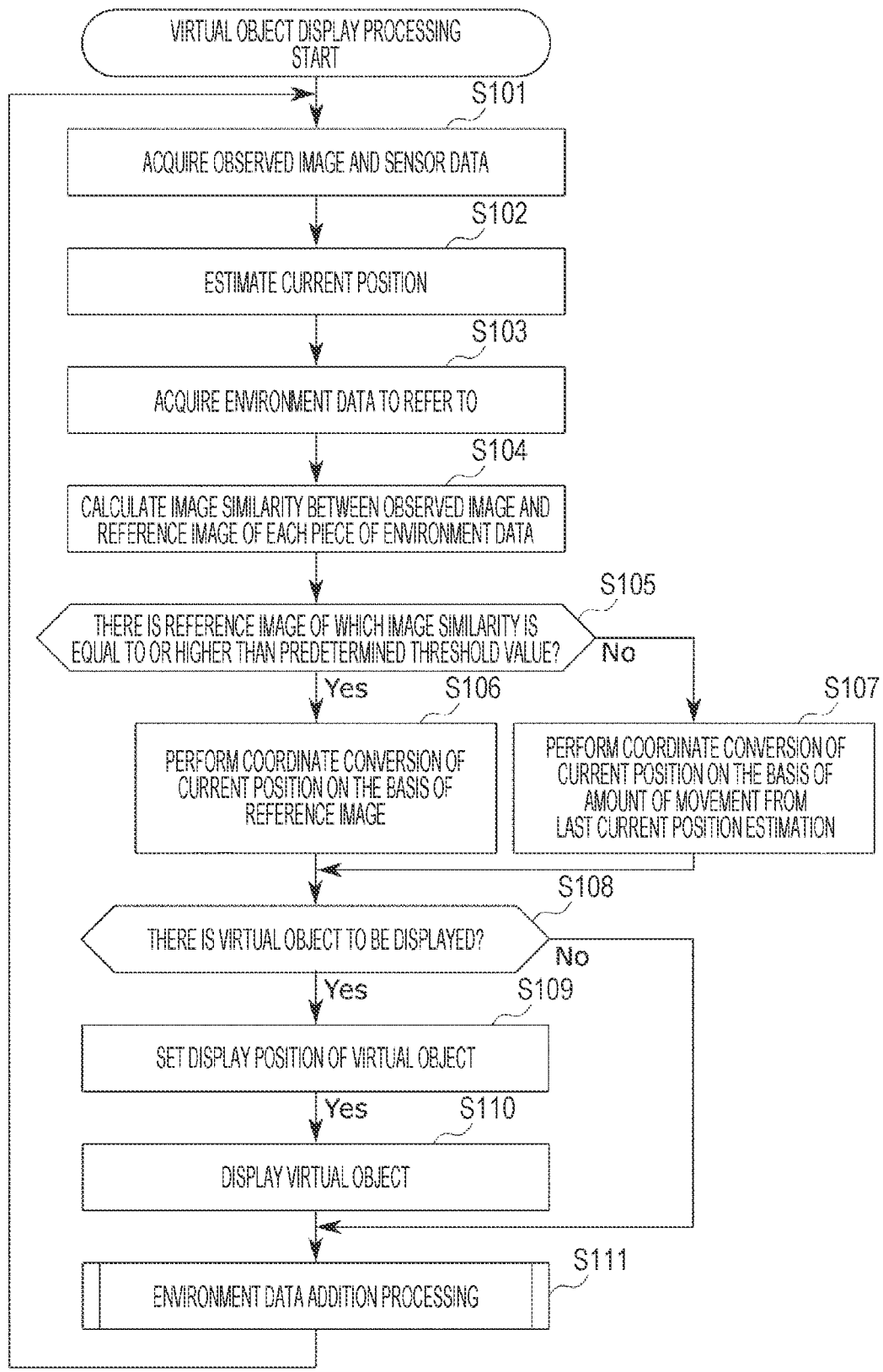
FIG. 4 is a flowchart for describing virtual object display processing.

Next, virtual object display processing performed by the information processing system 101 will be described with reference to the flowchart of FIG. 4.

This processing is started when the information processing system 101 is given a command to start displaying the virtual object, and ends when the information processing system 101 is given a command to stop displaying the virtual object, for example.

In step S101, the data acquisition unit 111 acquires an observed image and sensor data.

Specifically, the imaging unit 121 images the surroundings and supplies the obtained observed image to the image processing unit 131, the display position setting unit 133, and the environment DB management unit 135. Additionally, the imaging unit 121 supplies imaging parameters indicating the imaging conditions and the like of the observed image to the meta information generation unit 134.

Note that the types of imaging parameters of the observed image are the same as the types of imaging parameters of the reference image.

Additionally, each sensor of the sensor unit 122 acquires sensor data together with the observed image by performing detection processing at the time of and before and after capturing the observed image. The sensor unit 122 supplies the acquired sensor data to the position estimation unit 132 and the meta information generation unit 134.

Note that the type of sensor data acquired together with the observed image is the same as the type of sensor data acquired together with the reference image.

In step S102, the position estimation unit 132 estimates the current position. For example, the position estimation unit 132 estimates the current position of the information processing system 101 by using a predetermined self-position estimation processing method (e.g., simultaneously localization and mapping (SLAM)) on the basis of the sensor data. The current position of the information processing system 101 is represented by the position and orientation of a predetermined portion of the information processing system 101 in the self-position coordinate system, for example. Note that the self-position coordinate system is a coordinate system different from the 3D coordinate system.

Additionally, since the position of the imaging unit 121 in the information processing system 101 is known, the position estimation unit 132 calculates the imaging position of the observed image in the self-position coordinate system on the basis of the current position of the information processing system 101.

Note that the imaging position of an observed image here is represented by the position and orientation of a device (e.g., camera) that captures the observed image in the self-position coordinate system at the time of imaging, for example.

In step S103, the display position setting unit 133 acquires the environment data to refer to. For example, the display position setting unit 133 acquires, from the environment DB, environment data corresponding to a reference image of which difference from the imaging position of the observed image is within a predetermined range (captured near imaging position of observed image). At this time, the display position setting unit 133 may acquire multiple pieces of environment data.

In step S104, the display position setting unit 133 calculates the image similarity between the observed image and the reference image of each piece of environment data. For example, the display position setting unit 133 extracts feature points of the observed image and the reference image of each piece of environment data. Then, the display position setting unit 133 calculates the image similarity between the observed image and each reference image by comparing feature points of the observed image with feature points of each reference image.

Note that the image similarity is calculated on the basis of the reprojection error between corresponding feature points, number of common feature points, and difference in the total value of feature amounts of feature points in the observed image and the reference image, for example. For example, by weighting and adding the above data values, the image similarity as one scalar value is calculated.

In step S105, the display position setting unit 133 determines whether or not there is a reference image of which image similarity is equal to or higher than a predetermined threshold value. If it is determined that there is a reference image of which image similarity is equal to or higher than the predetermined threshold value, the processing proceeds to step S106.

In step S106, the display position setting unit 133 performs coordinate conversion of the current position on the basis of the reference image.

Specifically, the display position setting unit 133 obtains the relative relationship between imaging positions of the observed image and a reference image having the maximum image similarity with the observed image, on the basis of the relative relationship between positions of common feature points of the observed image and the reference image having the maximum image similarity with the observed image. Next, the display position setting unit 133 calculates the imaging position of the observed image in the 3D coordinate system on the basis of the obtained relative relationship. Next, based on the observed image and the imaging position in the self-position coordinate system and the imaging position of the observed image in the 3D coordinate system, the display position setting unit 133 obtains the relative relationship between the two coordinate systems. Then, the display position setting unit 133 converts the current position in the self-position coordinate system of the information processing system 101 into the current position in the 3D coordinate system on the basis of the relative relationship between the two coordinate systems.

The display position setting unit 133 supplies data indicating the imaging position of the observed image in the 3D coordinate system to the meta information generation unit 134. Additionally, the display position setting unit 133 adds the current date and time as a reference date and time to the environment data used for the coordinate conversion of the current position among the pieces of environment data stored in the environment DB storage unit 136.

Thereafter, the processing proceeds to step S108.

On the other hand, if it is determined in step S105 that there is no reference image of which image similarity is equal to or higher than the predetermined threshold value, the processing proceeds to step S107.

In step S107, the display position setting unit 133 performs coordinate conversion of the current position on the basis of the amount of movement from the last estimation of the current position. For example, the display position setting unit 133 acquires, from the position estimation unit 132, data indicating the difference between the result of this estimation of the current position of the information processing system 101 in the self-position coordinate system and the result of the last estimation of the current position in the self-position coordinate system. This difference data shows the amount of movement of the information processing system 101 from the time of the last estimation of the current position. The display position setting unit 133 calculates the current position of the information processing system 101 in the 3D coordinate system on the basis of the result of the last estimation of the current position of the information processing system 101 in the 3D coordinate system and the acquired difference data.

Additionally, since the position and orientation of the imaging unit 121 in the information processing system 101 are known, the display position setting unit 133 calculates the imaging position of the observed image in the 3D coordinate system on the basis of the current position of the information processing system 101 in the 3D coordinate system. The display position setting unit 133 supplies data indicating the imaging position of the observed image in the 3D coordinate system to the meta information generation unit 134.

Thereafter, the processing proceeds to step S108.

In step S108, the display position setting unit 133 determines whether or not there is a virtual object to be displayed. For example, the display position setting unit 133 calculates the user's visual field range in the 3D coordinate system on the basis of the current position of the information processing system 101 in the 3D coordinate system. Next, the display position setting unit 133 searches for a virtual object of which display position is within the user's visual field range from the virtual object information stored in the virtual object information storage unit 138. Then, if the display position setting unit 133 finds a virtual object of which display position is within the user's visual field range, the display position setting unit 133 determines that a virtual object to be displayed exists, and the processing proceeds to step S109.

In step S109, the display position setting unit 133 sets the display position of the virtual object. For example, the display position setting unit 133 calculates the display position of the virtual object in the display coordinate system of the display unit 113 on the basis of the user's visual field range and the display position of the virtual object in the 3D coordinate system. The display position setting unit 133 supplies data indicating the display position of the virtual object in the display coordinate system to the virtual object rendering unit 139.

In step S110, the information processing system 101 displays the virtual object. Specifically, the virtual object rendering unit 139 generates image data for displaying the virtual object to be displayed at a set display position. The virtual object rendering unit 139 supplies the generated image data to the display unit 113.

The display unit 113 displays a virtual object based on the acquired image data at a set display position. As a result, the virtual object is displayed at an appropriate position in the real world within the user's field of view.

Thereafter, the processing proceeds to step S111.

On the other hand, in step S108, if the display position setting unit 133 does not find a virtual object of which display position is within the user's visual field range, the display position setting unit 133 determines that there is no virtual object to be displayed, the processing in steps S109 and S110 are skipped, and the processing proceeds to step S111.

In step S111, the information processing unit 112 performs environment data addition processing, the processing then returns to step S101, and the processing after step S101 is performed.

Figure 5:
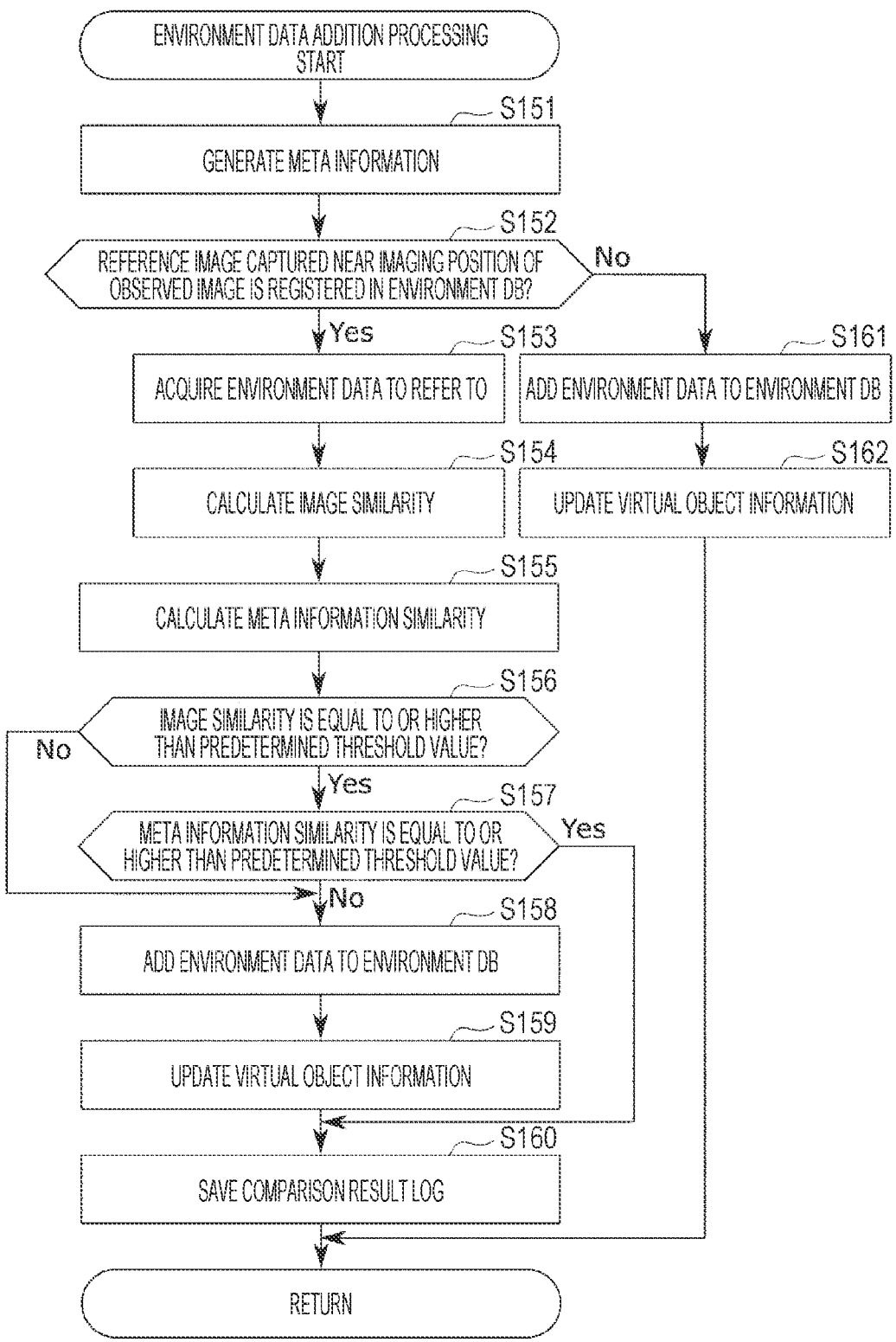
FIG. 5 is a flowchart for describing details of environment data addition processing.

Here, details of the environment data addition processing will be described with reference to the flowchart of FIG. 5.

In step S151, the information processing unit 112 generates meta information.

Specifically, the image processing unit 131 acquires data related to objects in the observed image by performing object recognition processing on the observed image. For example, the image processing unit 131 detects the types of objects in the observed image and the percentage of the area occupied by each type of object by performing semantic segmentation on the observed image. The image processing unit 131 supplies, to the meta information generation unit 134, object recognition data including the types of objects in the observed image and the percentage of the area occupied by each type of object.

The meta information generation unit 134 generates observation meta information including imaging parameters, object recognition data, imaging position, imaging date and time corresponding to the observed image, as well as sensor data acquired together with the observed image. The meta information generation unit 134 supplies the observation meta information to the environment DB management unit 135.

In step S152, the environment DB management unit 135 determines whether or not a reference image captured near the imaging position of the observed image is registered in the environment DB. For example, the environment DB management unit 135 searches the environment DB for a reference image of which difference from the imaging position of the observed image is within a predetermined range. Then, if the environment DB management unit 135 finds a reference image of which difference from the imaging position of the observed image is within the predetermined range, the environment DB management unit 135 determines that a reference image captured near the imaging position of the observed image is registered in the environment DB, and the processing proceeds to step S153.

In step S153, the environment DB management unit 135 acquires the environment data to refer to. For example, the environment DB management unit 135 acquires, from the environment DB storage unit 136, environment data (hereinafter referred to as reference environment data) corresponding to the reference image captured at the position closest to the imaging position of the observed image.

In step S154, the environment DB management unit 135 calculates the image similarity. Specifically, the environment DB management unit 135 calculates the image similarity between the observed image and the reference image included in the reference environment data by processing similar to that in step S104.

In step S155, the environment DB management unit 135 calculates the meta information similarity. Specifically, the environment DB management unit 135 calculates the meta information similarity, which is the similarity between the observation meta information corresponding to the observed image and the reference meta information included in the reference environment data. For example, the environment DB management unit 135 calculates the meta information similarity on the basis of the difference for each piece of data (e.g., shutter speed, acceleration, or the like) of the meta information excluding the imaging position. For example, the environment DB management unit 135 calculates the meta information similarity as one scalar value by weighting and adding the difference value for each piece of data included in the meta information.

In step S156, the environment DB management unit 135 determines whether or not the image similarity is equal to or higher than a predetermined threshold value. If it is determined that the image similarity is equal to or higher than the predetermined threshold value, the processing proceeds to step S157.

In step S157, the environment DB management unit 135 determines whether or not the meta information similarity is equal to or higher than a predetermined threshold value. If it is determined that the meta information similarity is less than the predetermined threshold value, the processing proceeds to step S158.

Note that the environment DB management unit 135 may perform the determination processing in step S157 on the basis of the similarity of each piece of data included in the meta information instead of the similarity of the entire meta information, for example. For example, the environment DB management unit 135 may perform the determination processing in step S157 on the basis of the number of data of which similarity is less than a predetermined threshold value among the pieces of data included in the meta information.

On the other hand, if it is determined in step S156 that the image similarity is less than a predetermined threshold value, the processing of step S157 is skipped and the processing proceeds to step S158.

That is, if at least one of the image similarity or the meta information similarity is less than the predetermined threshold value, that is, if the observation data including the observed image and the observation meta information and the reference environment data are not similar, the processing proceeds to step S158.

In step S158, the environment DB management unit 135 adds the environment data to the environment DB. Specifically, the environment DB management unit 135 adds the observation data including the observed image and the observation meta information to the environment DB stored in the environment DB storage unit 136 as new environment data. After that, the observed image and the observation meta information included in the added environment data are treated as a reference image and reference meta information.

As described above, if there is no environment data similar to the observation data including the observed image and the observation meta information acquired this time in the environment DB, the observation data is added to the environment DB as new environment data. More specifically, if environment data including the combination of a reference image and reference meta information similar to the combination of the observed image and the observation meta information included in the observation data does not exist in the environment DB, the observation data is added to the environment DB as new environment data.

In step S159, the virtual object information management unit 137 updates the virtual object information. For example, the virtual object information management unit 137 updates point cloud data on the basis of the environment data (observation data) added to the environment DB. More specifically, for example, the virtual object information management unit 137 updates point cloud data on the basis of feature points of the observed image. Additionally, the virtual object information management unit 137 adds or deletes the virtual object to be displayed as necessary, for example.

Thereafter, the processing proceeds to step S160.

On the other hand, if it is determined in step S157 that the meta information similarity is equal to or higher than the predetermined threshold value, the processing of steps S158 and S159 are skipped, and the processing proceeds to step S160.

That is, if environment data similar to the observation data including the observed image and the observation meta information acquired this time exists in the environment DB, the observation data is not added to the environment DB. More specifically, if environment data including the combination of a reference image and reference meta information similar to the combination of the observed image and the observation meta information included in the observation data exists in the environment DB, the observation data is not added to the environment DB.

In step S160, the environment DB management unit 135 saves the comparison result log. Specifically, the environment DB management unit 135 generates a comparison result log including the image similarity, data used for calculating the image similarity, the meta information similarity, data used for calculating the meta information similarity, and the imaging position of the observed image in the 3D coordinate system. The environment DB management unit 135 adds the generated comparison result log to the reference environment data stored in the environment DB storage unit 136.

Thereafter, the environment data addition processing ends.

On the other hand, in step S152, if the environment DB management unit 135 does not find a reference image of which difference from the imaging position of the observed image is within the predetermined range, the environment DB management unit 135 determines that a reference image captured near the imaging position of the observed image is not registered in the environment DB, and the processing proceeds to step S161.

In step S161, the environment data is added to the environment DB as in the processing of step S158. That is, the observation data is added to the environment DB as new environment data.

In step S162, virtual object information is updated as in the processing of step S159.

That is, if a reference image captures near the imaging position of the observed image is not registered in the environment DB, the observation data is unconditionally added to the environment DB as environment data, and the virtual object information is updated.

Thereafter, the environment data addition processing ends.

<Environment Data Deletion Processing>

Figure 6:
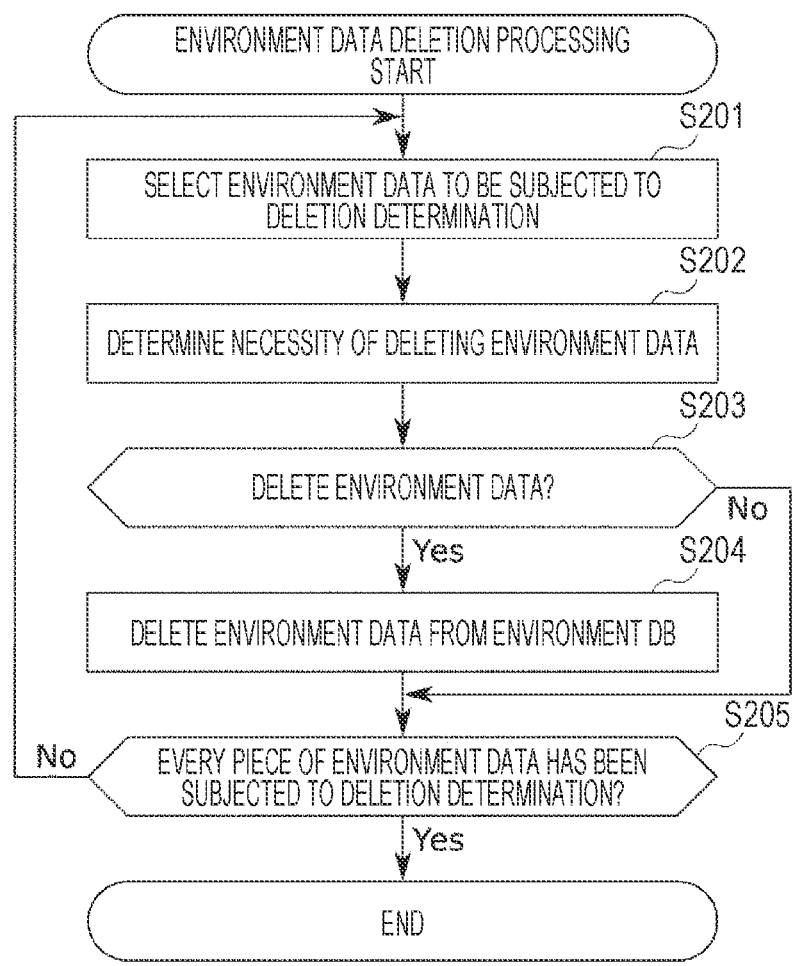
FIG. 6 is a flowchart for describing environment data deletion processing.

Next, environment data deletion processing performed by the information processing system 101 will be described with reference to the flowchart of FIG. 6.

This processing is performed at a predetermined timing, for example. For example, this processing is performed every predetermined period, such as when the amount of increase in the data of the environment DB from the last environment data deletion processing exceeds a predetermined threshold value, or when instructed by the user.

In step S201, the environment DB management unit 135 selects the environment data to be subjected to deletion determination. Specifically, the environment DB management unit 135 selects and reads one environment data that has not undergone the deletion determination among the pieces of environment data in the environment DB.

In step S202, the environment DB management unit 135 determines the necessity of deleting the environment data.

For example, if a log indicating that the image similarity with the reference image (observed image) of the environment data (observation data) added to the environment DB is less than a predetermined threshold value is recorded in the reference result log of environment data, the environment DB management unit 135 determines that the environment data needs to be deleted. That is, when adding observation data to the environment DB as environment data, if the environment data to be subjected to deletion determination is referred to as reference environment data and the reference image of the reference environment data is not similar to the observed image of the observation data, it is determined that the environment data needs to be deleted.

An example of such a case is when environment data (observation data) including a reference image (observed image) captured at almost the same position as the reference image of the environment data to be subjected to deletion determination and not similar to the captured image is newly added to the environment DB. As a result, environment data including a reference image in which the state of the imaging range has significantly changed from that at the time of imaging is deleted from the environment DB, for example.

Additionally, for example, if a log indicating that the meta information similarity with the meta information (observation meta information) of the environment data (observation data) added to the environment DB is less than a predetermined threshold value is recorded in the reference result log of environment data, the environment DB management unit 135 determines that the environment data needs to be deleted. That is, when adding observation data to the environment DB as environment data, if the environment data to be subjected to deletion determination is referred to as reference environment data and the reference meta information of the reference environment data is not similar to the observation meta information of the observation data, it is determined that the environment data needs to be deleted.

This is because at least one of the imaging parameters, the sensor data, the object recognition data, or the imaging date and time may differ greatly between the time of registration of the environment data to be subjected to deletion determination and the time of addition of new environment data, for example. As a result, environment data including a reference image of which imaging date is earlier than a predetermined period is deleted from the environment DB, for example. Additionally, for example, environment data in which the types of objects in the imaging range of the captured image, the area occupied in the imaging range, and the like have changed significantly since generation of the environment data is deleted.

Moreover, for example, the environment DB management unit 135 determines that environment data needs to be deleted in a case where the number of references to the environment data within a predetermined period, that is, the reference frequency is less than a predetermined threshold value. As a result, environment data that is rarely used is deleted, for example.

Note that the environment DB management unit 135 may calculate one parameter by weighting and adding the image similarity, the meta information similarity, and the number of references, and determine the necessity of deleting the environment data on the basis of the calculated parameter, for example.

Additionally, the environment DB management unit 135 may determine the necessity of deleting the environment data on the basis of the similarity of each piece of data included in the meta information instead of the similarity of the entire meta information, for example. For example, the environment DB management unit 135 may determine that environment data needs to be deleted in a case where the similarity of specific data in the meta information (e.g., imaging date of reference image) is low.

In step S203, the environment DB management unit 135 determines whether or not to delete the environment data on the basis of the result of the processing in step S202. If it is determined that the environment data is to be deleted, the processing proceeds to step S204.

In step S204, the environment DB management unit 135 deletes the environment data from the environment DB.

Thereafter, the processing proceeds to step S205.

On the other hand, if it is determined in step S203 that the environment data is not to be deleted, the processing of step S204 is skipped and the processing proceeds to step S205.

In step S205, the environment DB management unit 135 determines whether or not every piece of environment data has been subjected to deletion determination. If it is determined that the deletion determination has not been performed for every piece of environment data yet, the processing returns to step S201.

Thereafter, in step S205, the processing of steps S201 to S205 are repeatedly performed until it is determined that the deletion determination has been performed for every piece of environment data. As a result, the necessity of deleting every piece of environment data in the environment DB is determined, and the environment data determined to be deleted is deleted from the environment DB.

On the other hand, if it is determined in step S205 that the deletion determination has been performed for every piece of environment data, the environment data deletion processing ends.

As described above, update processing (addition and deletion of environment data) of the environment DB is performed using not only the reference image but also the meta information. As a result, changes in the display target space in the real world are quickly and accurately reflected in the environment DB, and the difference between the display target space in the real world and the display target space represented by the environment DB becomes small. That is, the accuracy of the environment DB is improved. As a result, the estimation accuracy of the current position of the information processing system 101 in the 3D coordinate system is improved, and the virtual object can be displayed at an appropriate position in the real world.

2. Second Embodiment

Next, a second embodiment of the present technology will be described with reference to FIG. 7.

Figure 7:
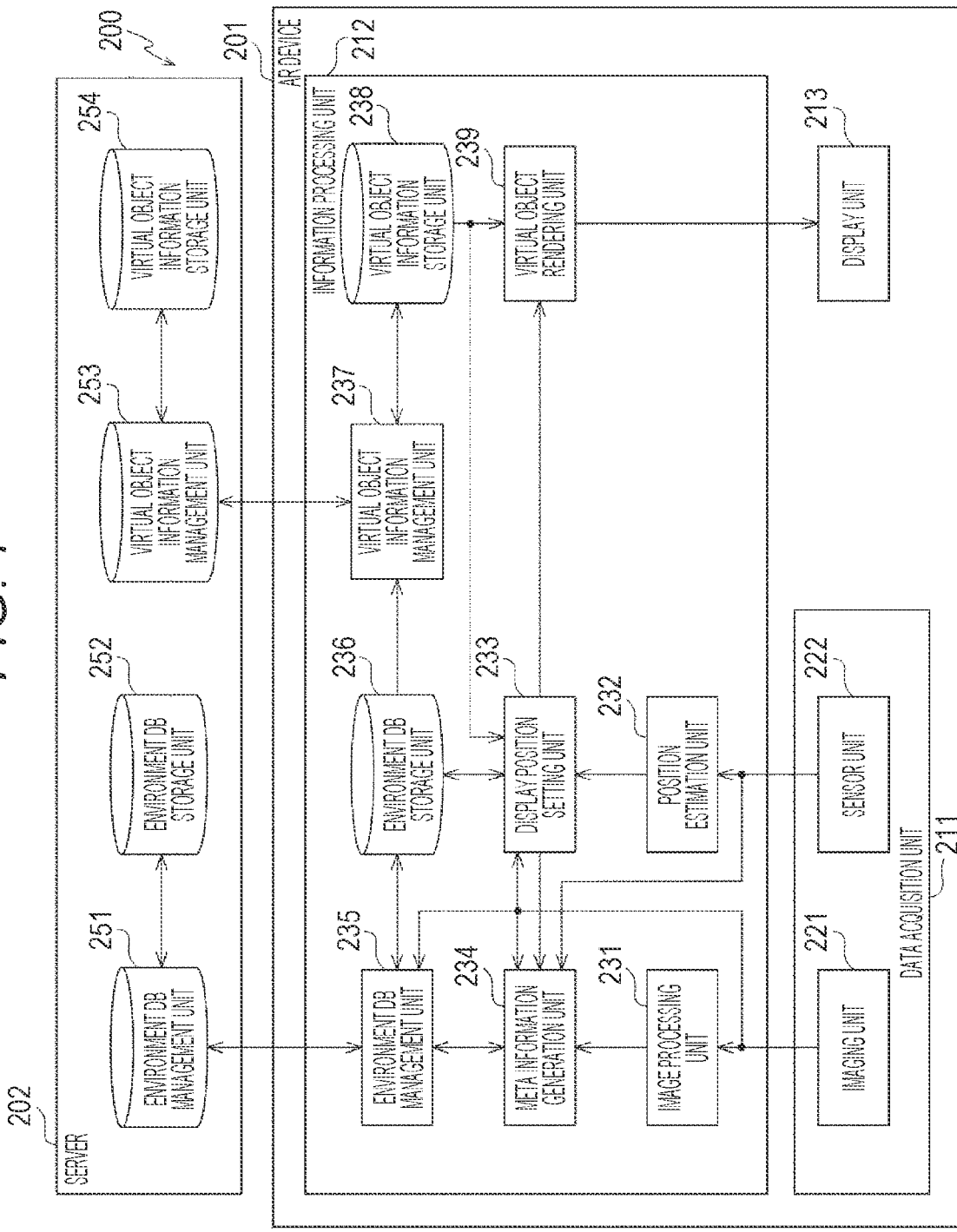
FIG. 7 is a block diagram showing a configuration example of an information processing system of a second embodiment of the present technology.

FIG. 7 shows a configuration example of an information processing system 200 of the second embodiment of the present technology. Note that parts corresponding to the information processing system 101 of FIG. 2 are given the same reference numerals in the last two digits, and the description of the parts having the same processing will be omitted as appropriate.

The information processing system 200 includes an augmented reality (AR) device 201 and a server 202.

The AR device 201 is a device corresponding to the information processing system 101 of FIG. 2. For example, the AR device 201 includes glasses-type eyewear or the like. Then, the AR device 201 superimposes and displays a virtual object on the real world that the user sees through the AR device 201.

The AR device 201 includes a data acquisition unit 211, an information processing unit 212, and a display unit 213. The data acquisition unit 211 includes an imaging unit 221 and a sensor unit 222. The information processing unit 212 includes an image processing unit 231, a position estimation unit 232, a display position setting unit 233, a meta information generation unit 234, an environment DB management unit 235, an environment DB storage unit 236, a virtual object information management unit 237, a virtual object information storage unit 238, and a virtual object rendering unit 239.

The server 202 includes an environment DB management unit 251, an environment DB storage unit 252, a virtual object information management unit 253, and a virtual object information storage unit 254.

The AR device 201 is significantly different from the information processing system 101 of FIG. 2 in that the environment DB and virtual object information are downloaded from the server 202 and used.

Specifically, the environment DB storage unit 252 of the server 202 stores the entire data of the environment DB. Additionally, the environment DB stored in the environment DB storage unit 252 is shared and used among multiple devices including the AR device 201.

Then, the environment DB management unit 235 of the AR device 201 communicates with the environment DB management unit 251 of the server 202, downloads a subset of the environment DB (part of environment data of environment DB) required for processing of the AR device 201 from the server 202, and stores the subset of the environment DB in the environment DB storage unit 236. Then, the environment DB stored in the environment DB storage unit 236 is used for processing of the AR device 201.

Additionally, the virtual object information storage unit 254 of the server 202 stores the entire data of the virtual object information. The virtual object information stored in the virtual object information storage unit 254 is shared and used among multiple devices including the AR device 201.

Then, the virtual object information management unit 237 of the AR device 201 communicates with the virtual object information management unit 253 of the server 202, downloads a subset of the virtual object information necessary for processing of the AR device 201 from the server 202, and stores the subset of the virtual object information in the virtual object information storage unit 238. Then, the virtual object information stored in the virtual object information storage unit 238 is used for processing of the AR device 201.

Here, as described above, the environment DB may be updated in the AR device 201. That is, the environment data of the environment DB may be added or deleted. In such a case, the updated contents of the environment DB of the AR device 201 may either be reflected or not reflected in the environment DB of the server 202.

In a case where the updated contents of the environment DB of the AR device 201 are reflected in the environment DB of the server 202, the environment DB management unit 235 transmits a query requesting update of the environment DB to the environment DB management unit 251, for example. Then, the environment DB management unit 251 updates the environment DB stored in the environment DB storage unit 252 on the basis of the received query.

Note that if the environment DB management unit 251 unconditionally updates the environment DB in response to a query, the accuracy of the environment DB may decrease or the environment DB may be tampered with, for example. In view of such problems, the environment DB management unit 251 may be configured to update the environment DB on the basis of a query when the environment DB management unit 251 receives a query having the same content from a predetermined number or more devices, for example.

Additionally, in order to prevent the AR device 201 from frequently transmitting a query to the server 202, for example, a period for prohibiting transmission of a query may be provided as follows, for example.

For example, the AR device 201 may prohibit transmission of a query until a predetermined time elapses from the last transmission of a query.

For example, the AR device 201 may prohibit transmission of a query until the movement amount of the AR device 201 (mobile body including AR device 201) exceeds a predetermined threshold value after the last transmission of a query.

For example, the AR device 201 may prohibit transmission of a query until an overlap rate between a newly captured observed image and an observed image at the time of the last transmission of a query exceeds a predetermined threshold value.

Additionally, as described above, the virtual object information may be updated in the AR device 201. Here, the updated contents of the virtual object information of the AR device 201 may either be reflected or not reflected in the virtual object information of the server 202.

In a case where the updated contents of the virtual object information of the AR device 201 are reflected in the virtual object information of the server 202, the virtual object information management unit 237 transmits a query requesting update of the virtual object information to the virtual object information management unit 253, for example. Then, the virtual object information management unit 253 updates the virtual object information stored in the virtual object information storage unit 254 on the basis of the received query.

Note that in order to prevent a decrease in the accuracy or tampering of the virtual object information, query restriction similar to that of the environment DB may be provided, for example.

3. Third Embodiment

Next, a third embodiment of the present technology will be described with reference to FIG. 8.

Figure 8:
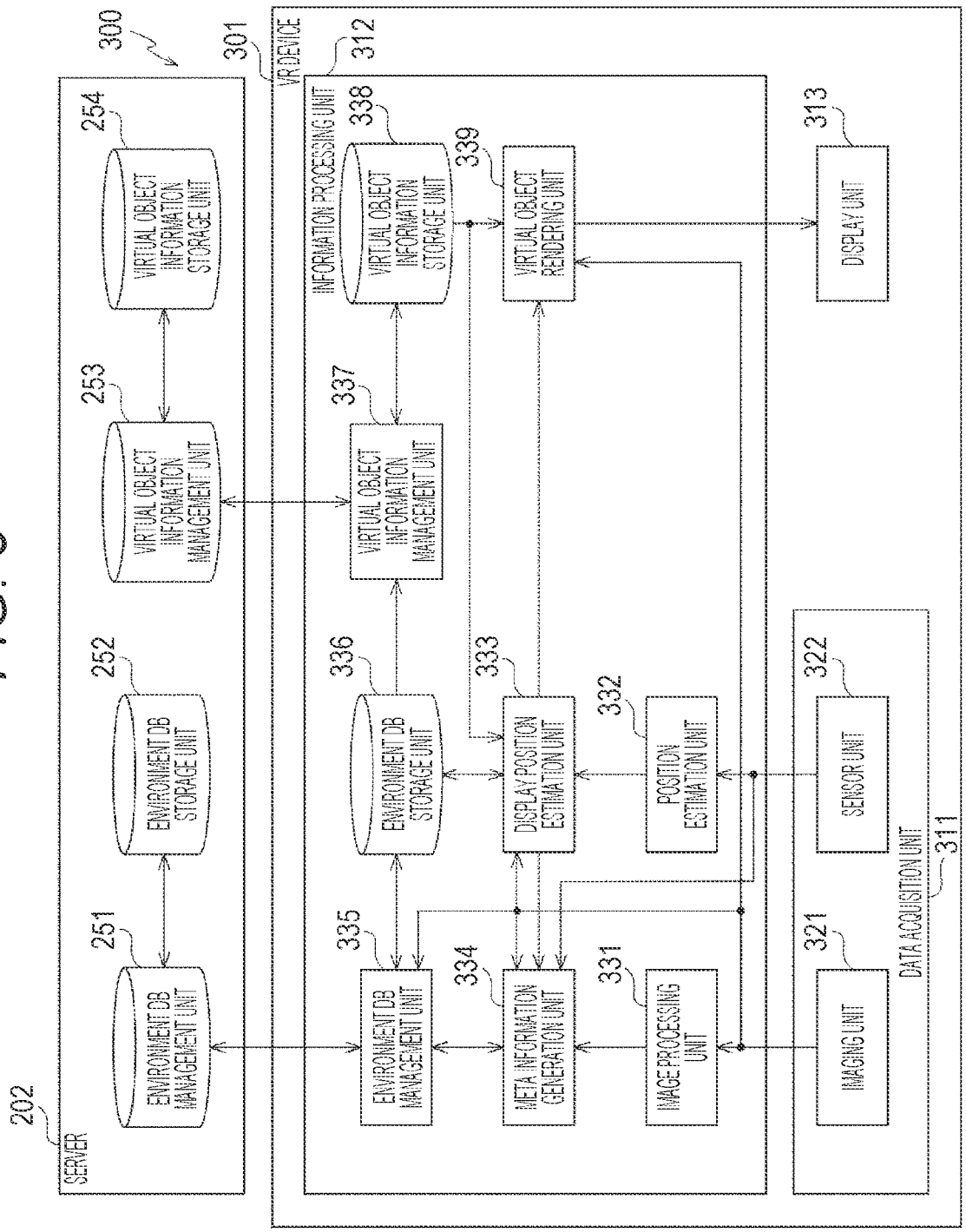
FIG. 8 is a block diagram showing a configuration example of an information processing system of a third embodiment of the present technology.

FIG. 8 shows a configuration example of an information processing system 300 of the third embodiment of the present technology. Note that parts corresponding to the information processing system 101 of FIG. 2 and the information processing system 200 of FIG. 7 are given the same reference numeral or the same reference numerals in the last two digits, and the description of the parts having the same processing will be omitted as appropriate.

The information processing system 300 is different from the information processing system 200 of FIG. 7 in that it includes a virtual reality (VR) device 301 instead of the AR device 201.

The VR device 301 is a device corresponding to the information processing system 101 of FIG. 2. For example, the VR device 301 includes a head mount display (HMD) or the like. Then, the VR device 301 superimposes and displays a virtual object on an observed image capturing the real world in the user's field of view, for example.

The VR device 301 includes a data acquisition unit 311, an information processing unit 312, and a display unit 313. The data acquisition unit 311 includes an imaging unit 321 and a sensor unit 322. The information processing unit 312 includes an image processing unit 331, a position estimation unit 332, a display position setting unit 333, a meta information generation unit 334, an environment DB management unit 335, an environment DB storage unit 336, a virtual object information management unit 337, a virtual object information storage unit 338 and a virtual object rendering unit 339.

The major difference between the VR device 301 and the AR device 201 is that the virtual object rendering unit 339 generates an image in which a virtual object is superimposed on an observed image captured by the imaging unit 321.

For example, the imaging unit 321 is installed so as to image a range including the user's field of view, images the real world in the range including the user's field of view, and supplies the captured observed image to the virtual object rendering unit 339.

The display position setting unit 333 estimates the current position of the VR device 301 in the 3D coordinate system by the above-described processing, and sets the display position of the virtual object in the observed image on the basis of the estimated current position.

The virtual object rendering unit 339 generates image data in which the virtual object is superimposed on the position of the observed image set by the display position setting unit 333, and supplies the image data to the display unit 313.

Based on the acquired image data, the display unit 413 displays an image in which the virtual object is superimposed on the real world in the range including the user's field of view.

As a result, the user can see an image in which the virtual object is superimposed on the real world, that is, an image in which the real world is expanded.

4. Fourth Embodiment

Next, a fourth embodiment of the present technology will be described with reference to FIG. 9.

Figure 9:
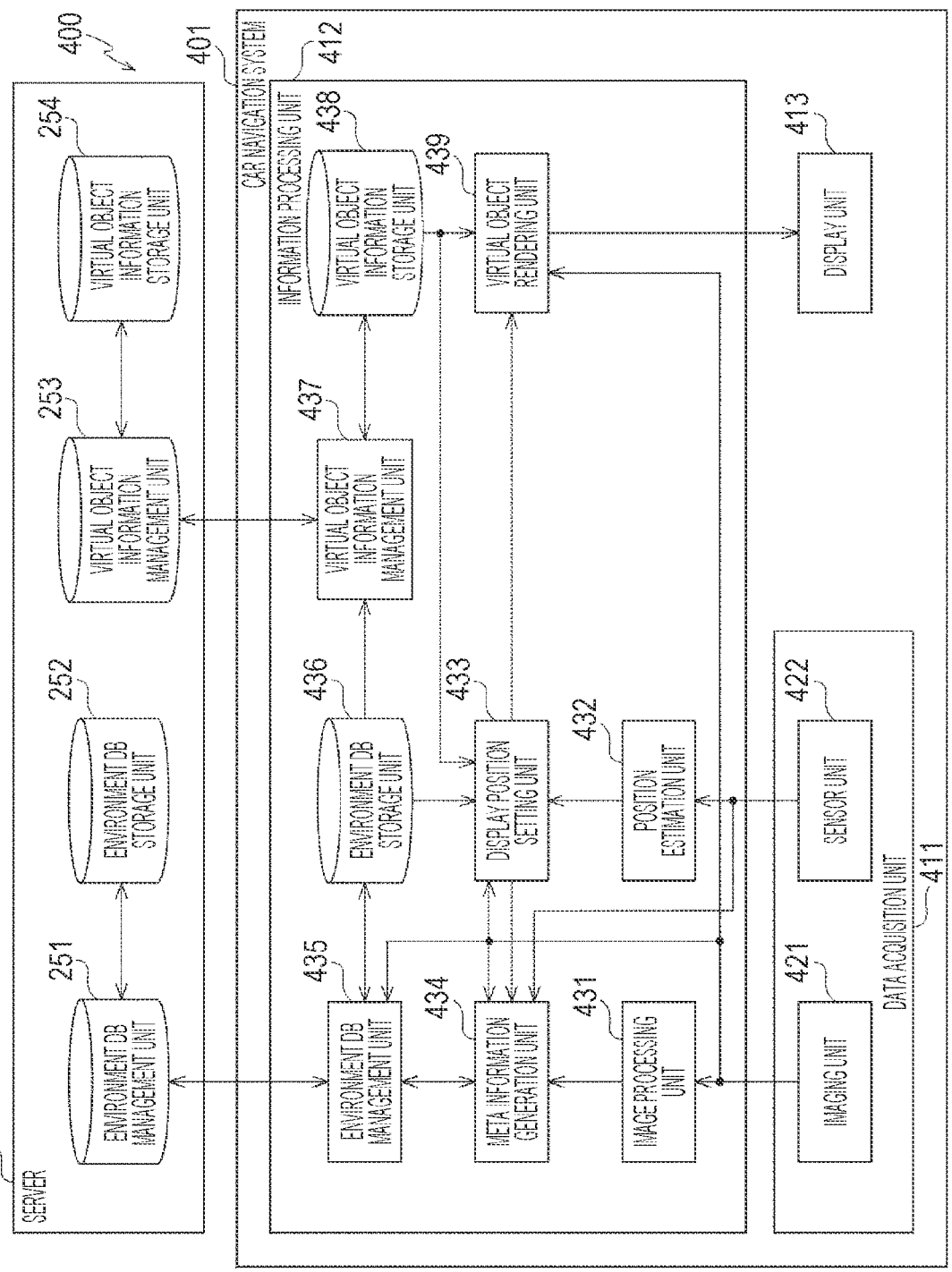
FIG. 9 is a block diagram showing a configuration example of an information processing system of a fourth embodiment of the present technology.

FIG. 9 shows a configuration example of an information processing system 400 of the fourth embodiment of the present technology. Note that parts corresponding to the information processing system 101 of FIG. 2 and the information processing system 300 of FIG. 8 are given the same reference numeral or the same reference numerals in the last two digits, and the description of the parts having the same processing will be omitted as appropriate.

The information processing system 400 is different from the information processing system 300 of FIG. 8 in that it includes a car navigation system 401 instead of the VR device 301.

The car navigation system 401 is a device corresponding to the information processing system 101 of FIG. 2. The car navigation system 401 is provided on a vehicle (not shown), for example, and displays a virtual object superimposed on an observed image capturing the real world in front of the vehicle.

The car navigation system 401 includes a data acquisition unit 411, an information processing unit 412, and a display unit 413. The data acquisition unit 411 includes an imaging unit 421 and a sensor unit 422. The information processing unit 412 includes an image processing unit 431, a position estimation unit 432, a display position setting unit 433, a meta information generation unit 434, an environment DB management unit 435, an environment DB storage unit 436, a virtual object information management unit 437, a virtual object information storage unit 438, and a virtual object rendering unit 439.

As described above, the car navigation system 401 has a similar configuration as the VR device 301.

Then, for example, the imaging unit 421 is installed in the vehicle so as to image the front of the vehicle, images the real world in front of the vehicle, and supplies the captured observed image to the virtual object rendering unit 439.

The display position setting unit 433 estimates the current position of the car navigation system 401 in the 3D coordinate system by the above-described processing, and sets the display position of the virtual object in the observed image on the basis of the estimated current position.

The virtual object rendering unit 439 generates image data in which the virtual object is superimposed on the position of the observed image set by the display position setting unit 433, and supplies the image data to the display unit 413.

Based on the acquired image data, the display unit 413 displays an image in which the virtual object is superimposed on the real world in front of the vehicle.

As a result, the user can see an image in which the virtual object is superimposed on the real world, that is, an image in which the real world is expanded.

This fourth embodiment can also be applied to a case of executing a map or navigation application program on a device such as a smartphone, for example.

5. Fifth Embodiment

Next, a fifth embodiment of the present technology will be described with reference to FIG. 10.

Figure 10:
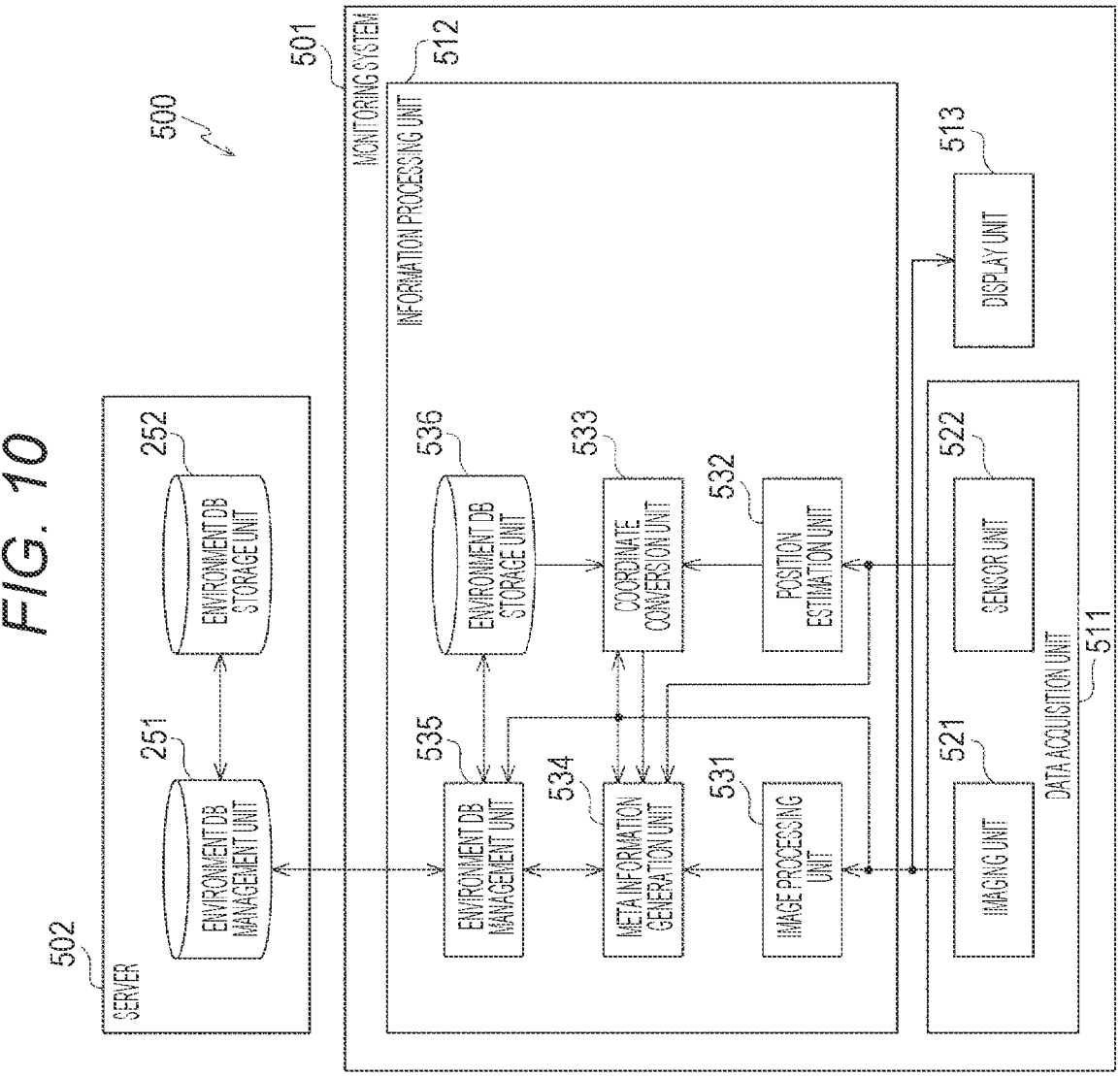
FIG. 10 is a block diagram showing a configuration example of an information processing system of a fifth embodiment of the present technology.

FIG. 10 shows a configuration example of an information processing system 500 of the fifth embodiment of the present technology. Note that parts corresponding to the information processing system 101 of FIG. 2 and the information processing system 200 of FIG. 7 are given the same reference numeral or the same reference numerals in the last two digits, and the description of the parts having the same processing will be omitted as appropriate.

The information processing system 500 includes a monitoring system 501 and a server 502.

The monitoring system 501 is a device corresponding to the information processing system 101 of FIG. 2. The monitoring system 501 is a system that monitors a predetermined monitoring area and displays an image capturing the monitoring area. Note that unlike the other systems described above, the monitoring system 501 does not have a function of displaying a virtual object.

The monitoring system 501 includes a data acquisition unit 511, an information processing unit 512, and a display unit 513. The data acquisition unit 511 includes an imaging unit 521 and a sensor unit 522. The information processing unit 512 includes an image processing unit 531, a position estimation unit 532, a coordinate conversion unit 533, a meta information generation unit 534, an environment DB management unit 535, and an environment DB storage unit 536.

The server 502 includes an environment DB management unit 251 and an environment DB storage unit 252.

The imaging unit 521 includes multiple cameras, for example, and each camera is installed so as to comprehensively photograph the monitoring area.

Then, the imaging unit 521 supplies each captured observed image to the display unit 513, and the display unit 513 displays each observed image. As a result, the user can monitor the monitoring area.

Additionally, the sensor unit 522 is provided near the imaging position of each camera of the imaging unit 521, and supplies the acquired sensor data to the information processing unit 512.

The information processing unit 512 updates the environment DB by processing similar to that of the information processing unit 112 of the information processing system 101 described above. Note, however, that since the information processing unit 512 does not perform virtual object display processing, the coordinate conversion unit 533 is provided instead of the display position setting unit, and the virtual object information management unit, the virtual object information storage unit, and the virtual object rendering unit are not provided.

The position estimation unit 532 estimates the imaging position in the self-position coordinate system of each camera of the imaging unit 521, and supplies data indicating the estimation result to the coordinate conversion unit 533.

The coordinate conversion unit 533 converts the imaging position of the self-position coordinate system of each camera of the imaging unit 521 into the imaging position in the 3D coordinate system on the basis of the environment DB, and supplies data indicating the conversion result to the meta information generation unit 534.

Note that since the monitoring system 501 normally images a wide range, the environment DB can be updated over a wide range. Then, by reflecting the updated contents of the environment DB in the environment DB of the server 502, update processing of the environment DB of the server 502 can be made more efficient. For example, environment data corresponding to each area in the monitoring area can be updated periodically.

Additionally, each camera of the monitoring system 501 normally has a fixed imaging position and imaging range. Hence, for example, the position estimation unit 532 and the coordinate conversion unit 533 may be omitted, and the imaging position of the 3D coordinate system of each camera may be given to the meta information generation unit 534 as a parameter.

6. Modification

Hereinafter, modifications of the above-described embodiments of the present technology will be described.

For example, in the second to fifth embodiments, it is possible to share the processing of each device and the server in a different manner. For example, the server may perform a part of the processing of each device. For example, the server may perform processing of estimating the current position, processing of setting the display position of the virtual object, processing of rendering the virtual object, and the like.

Additionally, in a case where the server side performs the processing of estimating the current position or setting the display position of the virtual object, for example, the device may change the resolution of the observed image supplied to the server according to the required accuracy, for example.

Moreover, the information processing system 1 of FIG. 1, the information processing system 101 of FIG. 2, the AR device 201 of FIG. 7, the VR device 301 of FIG. 8, the car navigation system 401 of FIG. 9, and the monitoring system 501 of FIG. 10 can include one device or include multiple devices.

Additionally, in the above description, an example of separating the system (e.g., information processing system 1) for generating the environment DB and virtual object information and the system (e.g., information processing system 101) for displaying virtual objects has been shown. However, one system (e.g., information processing system 101) may generate the environment DB and virtual object information, and display virtual objects.

Moreover, the environment DB and the virtual object information may be updated on the basis of the result of performing object recognition processing on the observed image, for example.

For example, the conditions for adding the observation data to the environment DB may be changed on the basis of objects in the observed image.

Specifically, for example, the image processing unit 131 of the information processing system 101 of FIG. 2 performs object recognition processing on the observed image, and supplies data indicating the recognition result to the environment DB management unit 135.

For example, in a case where the observed image contains a dangerous place such as a crossing, the environment DB management unit 135 eases the conditions for adding the observation data corresponding to the observed image to the environment DB compared with other observation data. With this configuration, observation data corresponding to observed images including dangerous places are more frequently registered in the environment DB. As a result, the estimation accuracy of the current position of the information processing system 101 in the 3D coordinate system is improved near dangerous places, and a virtual object that calls attention to the user is displayed at a more appropriate position, for example.

Additionally, the virtual object information management unit 137 may automatically generate a virtual object that calls attention to the user for such a dangerous place, for example.

Figure 11:
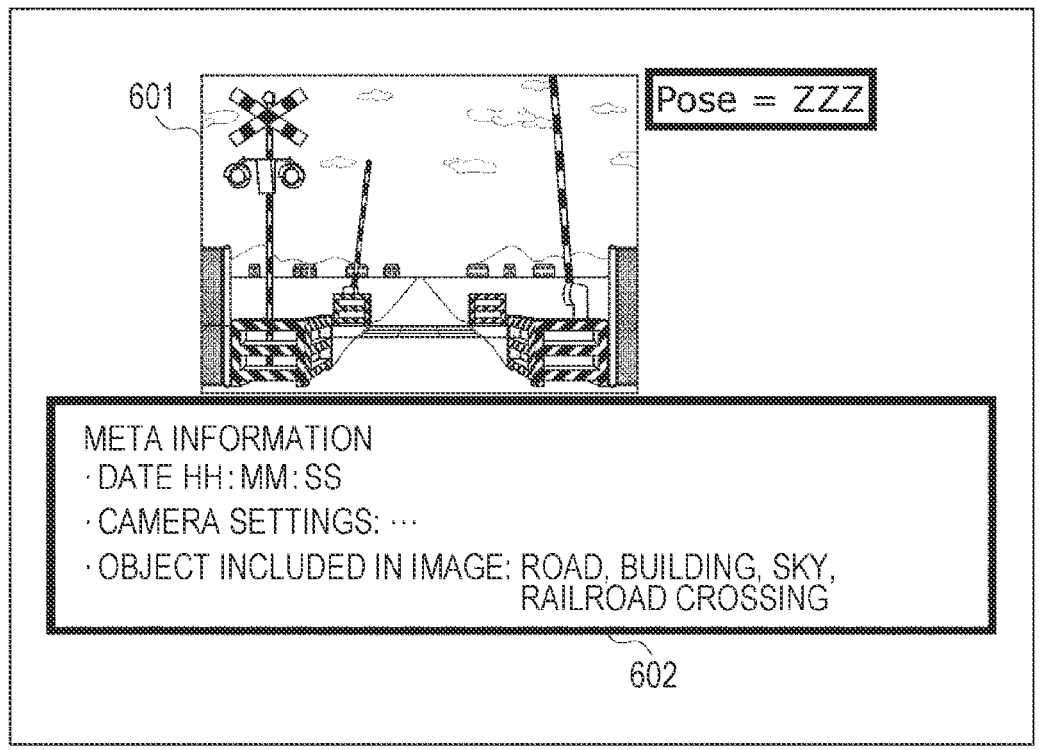
FIG. 11 is a diagram showing an example of environment data.

FIG. 11 shows an example of environment data for a dangerous place. The environment data of FIG. 11 includes a reference image 601 and reference meta information 602.

A railroad crossing is shown in the reference image 601 as a dangerous place.

The reference meta information 602 includes the imaging date and time of the reference image 601, setting information of a camera that captured the reference image 601 (imaging parameter), and the types of objects included in the reference image. A railroad crossing is included in the type of object.

Figure 12:
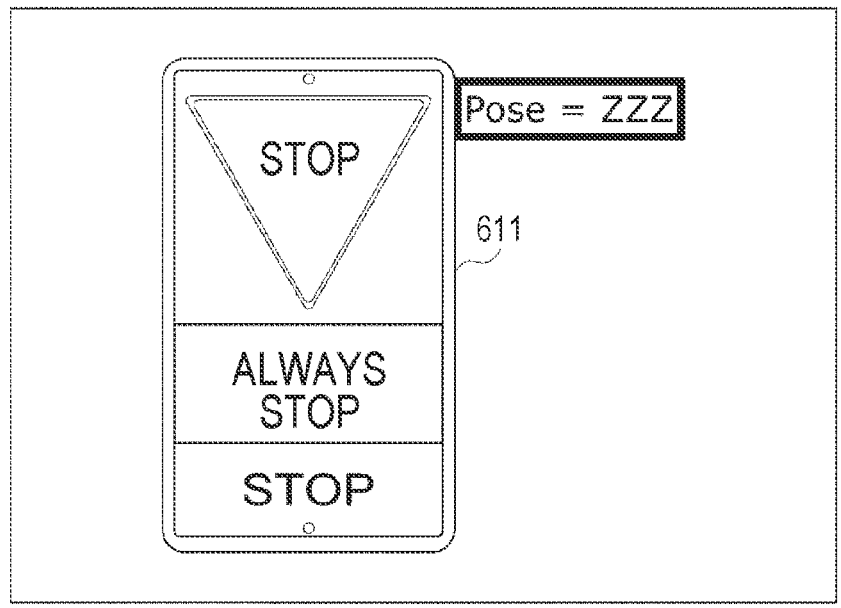
FIG. 12 is a diagram showing an example of a virtual object.

FIG. 12 shows an example of a virtual object 611 that is automatically generated in a case where the reference image 601 of FIG. 11 is acquired.

The virtual object 611 contains a sign and a message prompting the user to stop. Then, the display position of the virtual object 611 is set to the position indicated by Pose=ZZZ in FIG. 11.

As a result, the user can avoid danger.

Figure 13:
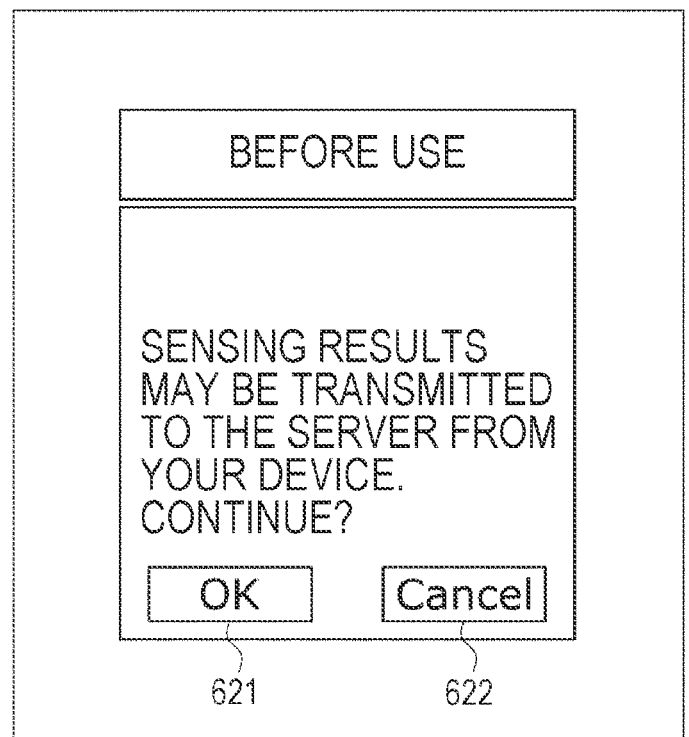
FIG. 13 is a diagram showing an example of a confirmation screen for consent to transmit sensing results.

Additionally, in the second to fifth embodiments of the present technology, there is a possibility that the environment data generated by each device may be transmitted to the server. Against this background, it is desirable to display a confirmation screen as shown in FIG. 13 before use of each device, for example, and obtain consent for transmission of environment data, particularly sensing results (e.g., observed image and sensor data), to the server from the user in advance.

For example, if the user allows the sensing results to be sent to the server, the user presses an OK button 621. On the other hand, for example, if the user does not allow the sensing results to be transmitted to the server, the user presses a cancel button 622.

This prevents the user's personal information and the like from being arbitrarily transmitted to the server and causing a problem later.

Moreover, in the second to fourth embodiments of the present technology, each device receives and uses a subset of necessary environment DB and virtual object information from the server while moving. In this regard, each device may select the environment data and virtual object information to be acquired from the server on the basis of the movement of each device or the moving body including each device, for example.

Figure 14:
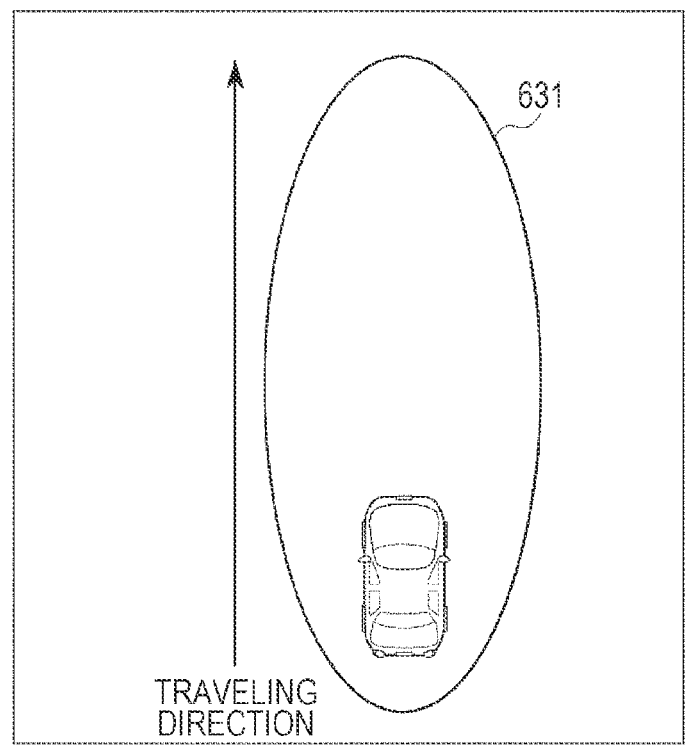
FIG. 14 is a diagram showing an example of a setting screen of an acquisition range of environment data and virtual object information.

FIG. 14 shows an example of a setting screen of an acquisition range of the environment DB and virtual object information. In this example, the user uses the AR device 201, the VR device 301, or the car navigation system 401 while moving in the vehicle. In this case, for example, the user sets a range 631 for acquiring environment data and virtual object information with reference to the position of the vehicle. Then, for example, the environment data and virtual object information corresponding to the range 631 are acquired from the server 202 and retained in the device.

As a result, the capacity of the environment data and virtual object information held in the device is reduced, and the necessary environment data and virtual object information are surely retained in the device. In the example of FIG. 14, the acquisition range 631 is wider in the traveling direction of the vehicle, and the environment data and virtual object information corresponding to the range in which the vehicle is predicted to travel are surely acquired in advance.

Additionally, in a case where the AR device 201 or the VR device 301 is a wearable device worn by a user, for example, each device may select the environment data and virtual object information to be acquired from the server 202 on the basis of the user who wears the wearable device.

Figure 15:
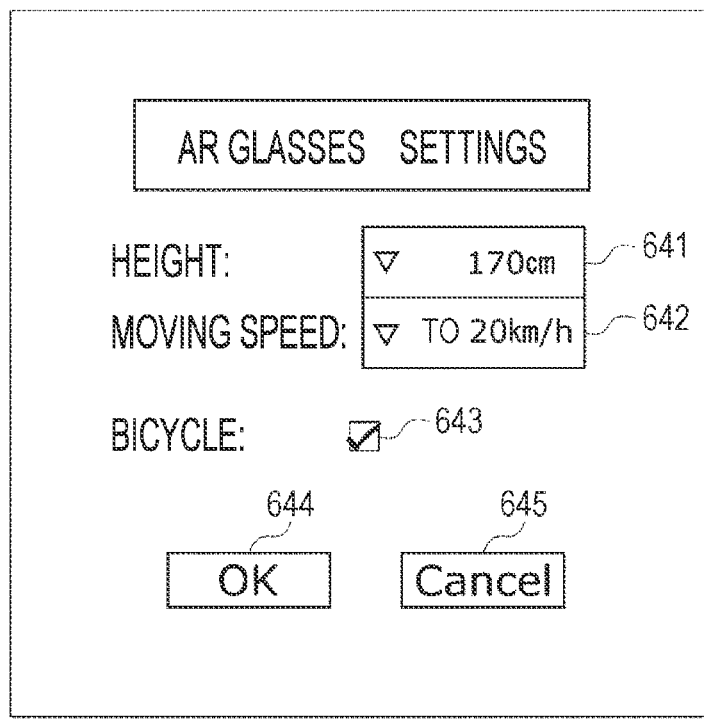
FIG. 15 is a diagram showing an example of a setting screen of an acquisition range of environment data and virtual object information.

FIG. 15 shows an example of a setting screen in a case where the AR device 201 includes AR glasses.

On the setting screen of FIG. 15, a list box 641, a list box 642, a checkbox 643, an OK button 644, and a cancel button 645 are displayed.

The list box 641 is used to input the physique of the user, more specifically, the height of the user.

The list box 642 is used to input the moving speed of the user.

The checkbox 643 is used to select how the user travels, more specifically, whether or not to travel by bicycle.

The OK button 644 is a button for confirming the setting contents.

The cancel button 645 is a button for canceling the setting contents and closing the setting screen.

For example, the height of the user's line of sight is assumed depending on the height of the user. Hence, for example, a range in the height direction for preferentially acquiring environment data and virtual object information from the server 202 is set on the basis of the height of the user.

Additionally, the moving range of the user within a predetermined time is assumed depending on the moving speed. Moreover, the direction of movement of the user is assumed to some extent depending on whether the user is riding a bicycle or walking. For example, in a case where the user is riding a bicycle, it is assumed that the distance to go straight is longer than that when walking. Then, a horizontal range for preferentially acquiring environment data and virtual object information from the server 202 is set on the basis of the moving speed and whether or not the user is riding a bicycle.

Then, the environment data and the virtual object information corresponding to the set range in the height direction and horizontal direction are preferentially acquired from the server 202 and retained. As a result, the capacity of the environment data and virtual object information held in the device is reduced, and the necessary environment data and virtual object information are surely retained in the device.

Moreover, in the above description, an example in which each piece of environment data includes a reference image has been shown. However, each piece of environment data may include, instead of the reference image or in addition to the reference image, feature point data related to the feature points of the reference image, for example. Feature point data includes the position and feature amount of each feature point extracted from the reference image, for example.

Additionally, in the above description, an example has been shown in which the current position of the information processing system 101 is converted from the self-position coordinate system to the 3D coordinate system, and the display position of a virtual object is set on the basis of the current position of the information processing system 101 in the 3D coordinate system. Conversely, for example, the display position of a virtual object in the self-position coordinate system may be obtained on the basis of the correlation between the self-position coordinate system and the 3D coordinate system, and the display position of the virtual object in the image coordinate system may be obtained.

Moreover, the types of data included in meta information (reference meta information and environment meta information) are not limited to the above-mentioned examples, and can be changed. For example, the estimation accuracy of the current position of the information processing system 101, for example, may be included in the meta information. Additionally, for example, the types of imaging parameters, sensor data, and object recognition data can be changed.

Additionally, the type of data included in the virtual object information is not limited to the above-mentioned example, and can be changed. For example, a 3D model of the display target area different from the point cloud data may be included in the virtual object information.

Moreover, in the above description, an example in which the position estimation unit 132 estimates the current position of the information processing system 101 has been shown. However, the current position of the moving body including the information processing system 101 may be estimated, for example.

7. Other

<Computer Configuration Example>

The series of processing described above can be performed by hardware or software. In a case where the series of processing is performed by software, a program that is included in the software is installed on a computer. Here, the computer includes a computer incorporated in dedicated hardware, a general-purpose personal computer, for example, that can execute various functions by installing various programs, and the like.

Figure 16:
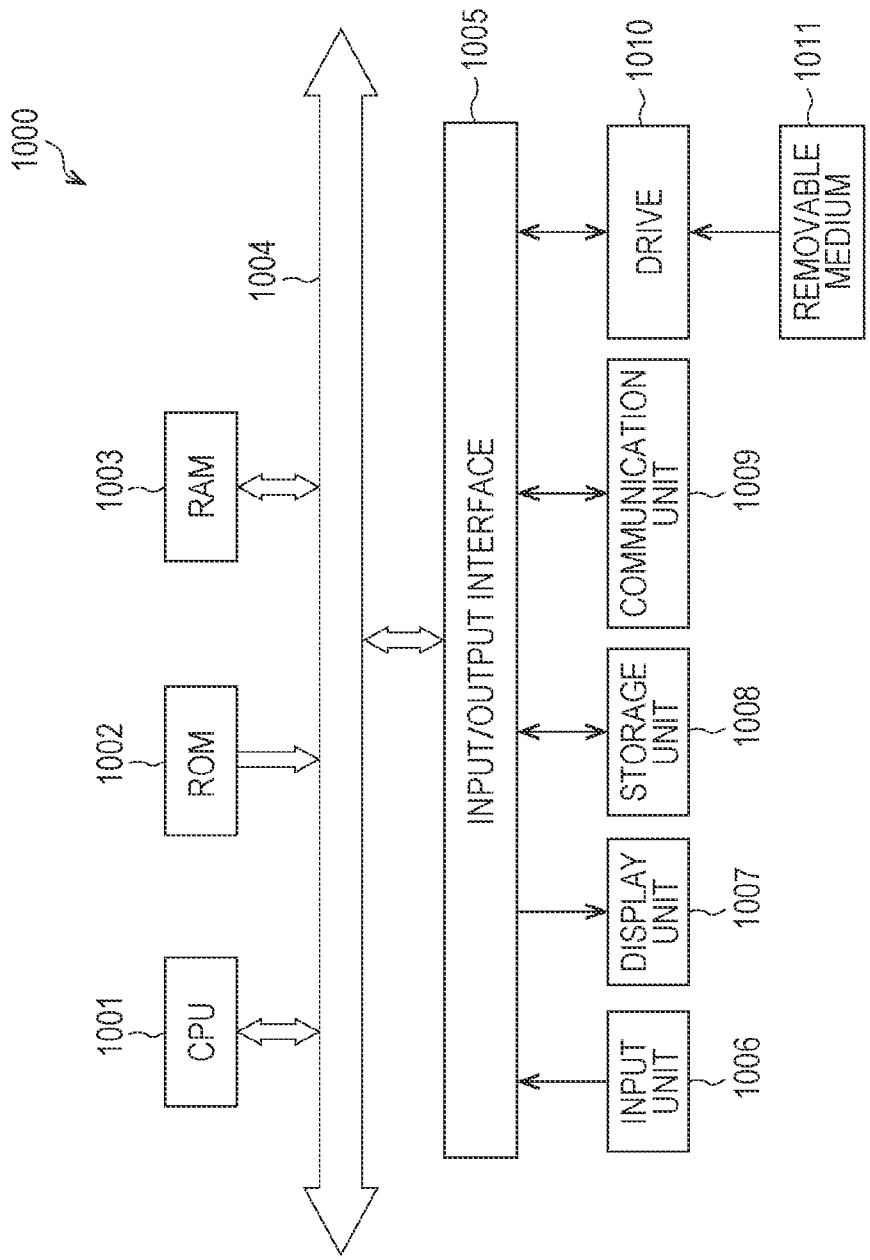
FIG. 16 is a diagram showing an example of a setting screen of an acquisition range of environment data and virtual object information.

FIG. 16 is a block diagram showing a hardware configuration example of a computer that executes the series of processing described above according to a program.

In a computer 1000, a central processing unit (CPU) 1001, a read only memory (ROM) 1002, and a random access memory (RAM) 1003 are mutually connected by a bus 1004.

An input/output interface 1005 is also connected to the bus 1004. An input unit 1006, an output unit 1007, a storage unit 1008, a communication unit 1009, and a drive 1010 are connected to the input/output interface 1005.

The input unit 1006 includes an input switch, a button, a microphone, an image sensor, and the like. The output unit 1007 includes a display, a speaker, and the like. The storage unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, for example, the CPU 1001 loads a program recorded in the storage unit 1008 to the RAM 1003 through the input/output interface 1005 and the bus 1004, and executes the above-described series of processing.

The program executed by the computer 1000 (CPU 1001) can be provided by being recorded on the removable medium 1011 such as a package medium. Additionally, the program can be provided through a wired or wireless transmission medium such as a local area network, the Internet, or digital satellite broadcasting.

In the computer 1000, the program can be installed in the storage unit 1008 through the input/output interface 1005 by attaching the removable medium 1011 to the drive 1010. Additionally, the program can be received by the communication unit 1009 through a wired or wireless transmission medium and be installed in the storage unit 1008. In addition, the program can be installed in advance in the ROM 1002 or the storage unit 1008.

Note that the program executed by the computer may be a program that performs processing in chronological order according to the order described in the present specification, or a program that performs processing in parallel, or at a necessary timing such as when a call is made.

Note that in the present specification, a system means a collection of multiple components (devices, modules (parts), and the like), and it does not matter whether or not all the components are in the same case. For this reason, multiple devices housed in separate cases and connected through a network, and one device housing multiple modules in one case are both systems.

Moreover, the embodiment of the present technology is not limited to the above-described embodiments, and various modifications can be made without departing from the scope of the present technology.

For example, the present technology can have a cloud computing configuration in which one function is shared and processed by multiple devices through a network.

Additionally, each step described in the above-described flowchart can be executed by one device or be executed in a shared manner by multiple devices.

Moreover, in a case where multiple processes are included in one step, the multiple processes included in one step can be executed by one device or be executed in a shared manner by multiple devices.

<Exemplar Combination of Configuration>

The present technology can also be configured as follows.

(1)

An information processing device including:

a position estimation unit that estimates a current position in a first coordinate system;

a display position setting unit that sets a display position of a virtual object in a third coordinate system on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position;

a meta information generation unit that generates observation meta information that is meta information corresponding to the observed image; and an environment database management unit that compares observation data including the observed image or observation feature point data containing data related to a feature point of the observed image and the observation meta information with the environment data of the environment database to determine whether to add the observation data to the environment database.

(2)

The information processing device according to (1) above, in which the environment database management unit adds the observation data to the environment database if the environment data similar to the observation data does not exist in the environment database.

(3)

The information processing device according to (1) or (2) above, further including an image processing unit that performs recognition processing on an object in the observed image, in which the environment database management unit changes a condition for adding the observation data to the environment database on the basis of the object in the observed image.

(4)

The information processing device according to any one of (1) to (3) above, in which the environment database management unit compares the observation data with reference environment data that is the environment data corresponding to the reference image captured near an imaging position of the observed image to determine whether to delete the reference environment data from the environment database.

(5)

The information processing device according to (4) above, in which the environment database management unit deletes the reference environment data from the environment database if the observation data and the reference environment data are not similar to each other.

(6)

The information processing device according to any one of (1) to (5) above, in which the environment database management unit determines whether to delete the environment data from the environment database on the basis of a reference frequency of the environment data.

(7)

The information processing device according to any one of (1) to (6) above, in which the reference meta information further includes at least one of an imaging parameter of the reference image, an imaging date and time of the reference image, data related to an object in the reference image, or sensor data acquired together with the reference image, and the observation meta information further includes at least one of an imaging parameter of the observed image, an imaging date and time of the observed image, data related to an object in the observed image, or sensor data acquired together with the observed image.

(8)

The information processing device according to (7) above, in which the imaging parameter includes at least one of a shutter speed, a white balance value, an F value, or an ISO value, the data related to an object in the observed image and the data related to an object in the reference image include at least one of a type of object or an area ratio of each type of object, and the sensor data includes at least one of acceleration, angular velocity, geomagnetism, a global navigation satellite system (GNSS) signal, or radio field intensity of a predetermined signal.

(9)

The information processing device according to any one of (1) to (8) above, in which the environment database management unit acquires at least a part of the environment data of the environment database from a server.

(10)

The information processing device according to (9) above, in which the environment database management unit selects the environment data to be acquired from the server on the basis of movement of the information processing device or of a moving body including the information processing device.

(11)

The information processing device according to (9) or (10) above, in which the environment database management unit selects the environment data to be acquired from the server on the basis of at least one of a physique, moving speed, or moving method of a user who wears the information processing device.

(12)

The information processing device according to any one of (9) to (11) above, in which the environment database management unit requests addition of the observation data to the environment database to the server.

(13)
The information processing device according to any one of (1) to (12) above, further including
a virtual object information management unit that updates the virtual object information on the basis of the observation data added to the environment database.

(14)
The information processing device according to any one of (1) to (13) above, in which
the virtual object information includes a 3D model in the second coordinate system of an area for displaying the virtual object, a display position of the virtual object in the 3D model, and a display content of the virtual object.

(15)
The information processing device according to any one of (1) to (14) above, in which
the display position setting unit obtains a relative relationship between the first coordinate system and the second coordinate system on the basis of a relative relationship between a position of a feature point of the observed image and a position of a feature point of the reference image similar to the observed image, and sets the display position of the virtual object in the third coordinate system on the basis of the relative relationship between the first coordinate system and the second coordinate system.

(16)
The information processing device according to any one of (1) to (15) above, further including
a virtual object rendering unit that generates image data for displaying the virtual object at the display position in the third coordinate system.

(17)
The information processing device according to any one of (1) to (16) above, in which
the third coordinate system is a coordinate system of a display unit that displays the virtual object.

(18)
An information processing method including:
by an information processing device,
estimating a current position in a first coordinate system;
setting a display position of a virtual object in a third coordinate system on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position;
generating observation meta information that is meta information corresponding to the observed image; and
comparing observation data including the observed image or observation feature point data containing data related to a feature point of the observed image and the observation meta information with the environment data of the environment database to determine whether to add the observation data to the environment database.

(19)
A program for causing a computer to perform processing including the steps of:
estimating a current position in a first coordinate system;
setting a display position of a virtual object in a third coordinate system on the basis of an environment database in which multiple pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position;
generating observation meta information that is meta information corresponding to the observed image; and
comparing observation data including the observed image or observation feature point data containing data related to a feature point of the observed image and the observation meta information with the environment data of the environment database to determine whether to add the observation data to the environment database.

Note that the effect described in the present specification is merely an illustration and is not restrictive. Hence, other effects can be obtained.

REFERENCE SIGNS LIST

1 Information processing system
12 Information processing unit
31 Image processing unit
32 Meta information generation unit
33 Environment DB generation unit
34 Virtual object information generation unit
101 Information processing system
112 Information processing unit
113 Display unit
131 Image processing unit
132 Position estimation unit
133 Display position setting unit
134 Meta information generation unit
135 Environment DB management unit
137 Virtual object information management unit
139 Virtual object rendering unit
200 Information processing system
201 AR device
202 Server
212 Information processing unit
213 Display unit
231 Image processing unit
232 Position estimation unit
233 Display position setting unit
234 Meta information generation unit
235 Environment DB management unit
237 Virtual object information management unit
239 Virtual object rendering unit
251 Environment DB management unit
253 Virtual object information management unit
300 Information processing system
301 VR device
312 Information processing unit
313 Display unit
331 Image processing unit
332 Position estimation unit 333 Display position setting unit
334 Meta information generation unit
335 Environment DB management unit
337 Virtual object information management unit
339 Virtual object rendering unit
400 Information processing system
401 Car navigation system
412 Information processing unit
413 Display unit
431 Image processing unit
432 Position estimation unit
433 Display position setting unit
434 Meta information generation unit
435 Environment DB management unit
437 Virtual object information management unit
439 Virtual object rendering unit
500 Information processing system
501 Monitoring system
502 Server
512 Information processing unit
513 Display unit
531 Image processing unit
532 Position estimation unit
533 Coordinate conversion unit
534 Meta information generation unit
535 Environment DB management unit

The invention claimed is:

1. An information processing device, comprising:
a central processing unit (CPU) configured to:
estimate a current position in a first coordinate system;
set a display position of a virtual object in a third coordinate system based on an environment database in which a plurality of pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position;
generate observation meta information that is meta information corresponding to the observed image; and
compare observation data including the observed image or observation feature point data containing data related to a feature point of the observed image and the observation meta information with the environment data of the environment database to determine whether to add the observation data to the environment database.

2. The information processing device according to claim 1, wherein the CPU is further configured to add the observation data to the environment database if the environment data similar to the observation data does not exist in the environment database.

3. The information processing device according to claim 1, wherein the CPU is further configured to:
perform recognition process on an object in the observed image; and
change, based on the object in the observed image, a condition to add the observation data to the environment database.

4. The information processing device according to claim 1, wherein the CPU is further configured to compare the observation data with reference environment data that is the environment data corresponding to the reference image captured near an imaging position of the observed image to determine whether to delete the reference environment data from the environment database.

5. The information processing device according to claim 4, wherein CPU is further configured to delete the reference environment data from the environment database if the observation data and the reference environment data are not similar to each other.

6. The information processing device according to claim 1, wherein the CPU is further configured to determine whether to delete the environment data from the environment database based on a reference frequency of the environment data.

7. The information processing device according to claim 1, wherein
the reference meta information further includes at least one of an imaging parameter of the reference image, an imaging date and time of the reference image, data related to an object in the reference image, or sensor data acquired together with the reference image, and
the observation meta information further includes at least one of an imaging parameter of the observed image, an imaging date and time of the observed image, data related to an object in the observed image, or sensor data acquired together with the observed image.

8. The information processing device according to claim 7, wherein
the imaging parameter includes at least one of a shutter speed, a white balance value, an F value, or an ISO value,
the data related to an object in the observed image and the data related to an object in the reference image include at least one of a type of object or an area ratio of each type of object, and
the sensor data includes at least one of acceleration, angular velocity, geomagnetism, a global navigation satellite system (GNSS) signal, or radio field intensity of a predetermined signal.

9. The information processing device according to claim 1, wherein the CPU is further configured to acquire at least a part of the environment data of the environment database from a server.

10. The information processing device according to claim 9, wherein the CPU is further configured to select the environment data to be acquired from the server based on movement of the information processing device or of a moving body including the information processing device.

11. The information processing device according to claim 9, wherein the CPU is further configured to select the environment data to be acquired from the server based on least one of a physique, moving speed, or moving method of a user who wears the information processing device.

12. The information processing device according to claim 9, wherein the CPU is further configured to request addition of the observation data to the environment database to the server.

13. The information processing device according to claim 1, wherein the CPU is further configured to update the virtual object information based on the observation data added to the environment database.

14. The information processing device according to claim 1, wherein the virtual object information includes a 3D model in the second coordinate system of an area to display the virtual object, the display position of the virtual object in the 3D model, and a display content of the virtual object.

15. The information processing device according to claim 1, wherein the CPU is further configured to:

obtain a relative relationship between the first coordinate system and the second coordinate system based on a relative relationship between a position of a feature point of the observed image and a position of a feature point of the reference image similar to the observed image; and set the display position of the virtual object in the third coordinate system based on the relative relationship between the first coordinate system and the second coordinate system.

16. The information processing device according to claim 1, wherein the CPU is further configured to generate image data to display the virtual object at the display position in the third coordinate system.

17. The information processing device according to claim 1, wherein the third coordinate system is a coordinate system of a display screen that displays the virtual object.

18. An information processing method, comprising:
by an information processing device,
estimating a current position in a first coordinate system;
setting a display position of a virtual object in a third coordinate system based on an environment database in which a plurality of pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position;
generating observation meta information that is meta information corresponding to the observed image; and
comparing observation data including the observed image or observation feature point data containing data related to a feature point of the observed image and the observation meta information with the environment data of the environment database to determine whether to add the observation data to the environment database.

19. A non-transitory computer-readable medium including computer-executable instructions, which when executed by a computer, causes the computer to execute operations, the operations comprising:
estimating a current position in a first coordinate system;
setting a display position of a virtual object in a third coordinate system based on an environment database in which a plurality of pieces of environment data including a reference image or reference feature point data containing data related to a feature point of the reference image and reference meta information that is meta information corresponding to the reference image are registered, virtual object information including the display position of the virtual object in a second coordinate system, and an observed image captured near the current position;
generating observation meta information that is meta information corresponding to the observed image; and
comparing observation data including the observed image or observation feature point data containing data related to a feature point of the observed image and the observation meta information with the environment data of the environment database to determine whether to add the observation data to the environment database.

* * * * *